United States Patent
Raj Susairaju et al.

(10) Patent No.: US 12,137,185 B2
(45) Date of Patent: *Nov. 5, 2024

(54) DUAL-PRONG CALL PROGRESS ASSESSMENT AND ROUTING

(71) Applicant: Acqueon Inc., Irving, TX (US)

(72) Inventors: Ashok Raj Susairaju, Chennai (IN); Ashish Koul, San Jose, CA (US)

(73) Assignee: ACQUEON TECHNOLOGIES INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/504,890

(22) Filed: Nov. 8, 2023

(65) Prior Publication Data

US 2024/0155053 A1    May 9, 2024

Related U.S. Application Data

(63) Continuation of application No. 18/147,663, filed on Dec. 28, 2022, now Pat. No. 11,876,930, which is a continuation of application No. 17/828,616, filed on May 31, 2022, now Pat. No. 11,622,041, which is a continuation-in-part of application No. 17/571,526, filed on Jan. 9, 2022, now Pat. No. 11,483,429, which is a continuation of application No. 17/348,545, filed on Jun. 15, 2021, now Pat. No. 11,223,722.

(Continued)

(51) Int. Cl.
H04M 3/00     (2024.01)
G06Q 10/0631  (2023.01)
H04M 3/51     (2006.01)

(52) U.S. Cl.
CPC .... *H04M 3/5158* (2013.01); *G06Q 10/06311* (2013.01); *H04M 3/5183* (2013.01)

(58) Field of Classification Search
CPC .............. H04M 3/5158; H04M 3/5183; G06Q 10/06311
USPC .......................... 379/201.01, 265.01–265.14, 379/266.01–266.1, 309
See application file for complete search history.

(56) References Cited

U.S. PATENT DOCUMENTS 5,343,518 A    8/1994   Kneipp
5,436,965 A    7/1995   Grossman et al.
(Continued)

*Primary Examiner* — William J Deane, Jr.
(74) *Attorney, Agent, or Firm* — Galvin Patent Law LLC; Brian R. Galvin

(57) ABSTRACT

A system and method for enhanced call progress assessment (CPA) utilizing dual-prong analysis, comprising a campaign management console, a data services engine, a traffic shaper, an agent desktop, an optimized CPA service, an auto-dialer with built-in CPA capabilities, and a simple dialer which allows enterprises to process outbound calls in parallel in order to quickly and accurately determine outbound call outcome, a live person or an answering machine or service, which can be used to route outbound calls in an appropriate manner. The system and method utilize a plurality of specialized CPA methods running in parallel to a built-in CPA system to analyze audio stream data associated with an outbound call and uses various entity-specific threshold parameters to determine a call outcome based on the results of the plurality of CPA methods. Such a system and method can provide faster and more accurate CPA using a dual prong approach.

30 Claims, 18 Drawing Sheets

Related U.S. Application Data

(60) Provisional application No. 63/130,014, filed on Dec. 23, 2020.

(56) References Cited

U.S. PATENT DOCUMENTS

| | | |
|---|---|---|
| 5,796,791 A | 8/1998 | Polcyn |
| 5,802,161 A | 9/1998 | Svoronos et al. |
| 5,946,386 A | 8/1999 | Rogers et al. |
| 6,404,885 B1 | 6/2002 | Field et al. |
| 6,621,900 B1 | 9/2003 | Rice |
| 7,502,460 B2 | 3/2009 | Rodenbusch et al. |
| 7,558,383 B2 | 7/2009 | Shtivelman et al. |
| 7,995,742 B2 | 8/2011 | Lenard |
| 9,635,182 B2 | 4/2017 | Segall |
| 9,838,538 B1 | 12/2017 | Andraszek |
| 10,084,915 B1 | 9/2018 | Andraszek |
| 10,148,818 B1 | 12/2018 | Koster |
| 10,516,781 B1 * | 12/2019 | Koster ................ H04M 3/5158 |
| 10,742,810 B1 * | 8/2020 | Gudger .................. H04W 8/18 |
| 10,965,761 B1 | 3/2021 | Ouimette et al. |
| 2005/0002515 A1 | 1/2005 | Mewhinney et al. |
| 2005/0008141 A1 | 1/2005 | Kortum et al. |
| 2006/0062376 A1 | 3/2006 | Pickford |
| 2007/0127699 A1 | 6/2007 | Lenard |
| 2008/0118050 A1 | 5/2008 | Rodenbusch et al. |
| 2016/0119475 A1 * | 4/2016 | Bohlin ................ H04M 3/5158 379/266.07 |
| 2020/0175585 A1 * | 6/2020 | Kennedy ................ H04M 3/38 |
| 2021/0409543 A1 | 12/2021 | Vergin et al. |

* cited by examiner

```
┌─────────────────────────────────────────────────────────────┐
│ facilitate a tethered connection between an agent desktop   │
│ and an auto-dialer                                          │
│                            510                              │
└─────────────────────────────────────────────────────────────┘
                              ↓
┌─────────────────────────────────────────────────────────────┐
│ allow contact center agents to establish agent availability │
│                            520                              │
└─────────────────────────────────────────────────────────────┘
                              ↓
┌─────────────────────────────────────────────────────────────┐
│ display at least one customer number from at least one      │
│ customer record delivered from a data services engine       │
│                            530                              │
└─────────────────────────────────────────────────────────────┘
                              ↓
┌─────────────────────────────────────────────────────────────┐
│ allow agents to interact with the at least one customer     │
│ record                                                      │
│                            540                              │
└─────────────────────────────────────────────────────────────┘
                              ↓
┌─────────────────────────────────────────────────────────────┐
│ automatically dial any number of received Prior Express     │
│ Written Consent customer records                            │
│                            550                              │
└─────────────────────────────────────────────────────────────┘
                              ↓
┌─────────────────────────────────────────────────────────────┐
│ establish a tethered connection between a Prior Express     │
│ Written Consent customer record and any designated          │
│ recipient for the communication                             │
│                            560                              │
└─────────────────────────────────────────────────────────────┘
                              ↓
┌─────────────────────────────────────────────────────────────┐
│ dial the customer number that has been forwarded from an    │
│ agent desktop                                               │
│                            570                              │
└─────────────────────────────────────────────────────────────┘
                              ↓
┌─────────────────────────────────────────────────────────────┐
│ establish a tethered connection between a designated        │
│ recipient and the dialed customer number                    │
│                            580                              │
└─────────────────────────────────────────────────────────────┘
```

Fig. 5

```
┌─────────────────────────────────────────────────────────────────┐
│ Enterprise customer representative (i.e. system administrator)  │
│ logs into campaign manager console, specifies inbound agent     │
│ preference and/or outbound dialer agent preference              │
│                            810                                  │
└─────────────────────────────────────────────────────────────────┘
                                │
                                ▼
┌─────────────────────────────────────────────────────────────────┐
│ Enterprise customer uploads list of customer records including  │
│                       PEWC status                               │
│                            820                                  │
└─────────────────────────────────────────────────────────────────┘
                                │
                                ▼
┌─────────────────────────────────────────────────────────────────┐
│ Campaign manager console sorts PEWC from non-PEWC records,      │
│ sends PEWC records to ADTS, non-PEWC to contact center system   │
│ specified by enterprise                                         │
│                            830                                  │
└─────────────────────────────────────────────────────────────────┘
                                │
                                ▼
┌─────────────────────────────────────────────────────────────────┐
│ Alternative contact center system agents handle non-PEWC        │
│ communications                                                  │
│                            840                                  │
└─────────────────────────────────────────────────────────────────┘
                                │
                                ▼
┌─────────────────────────────────────────────────────────────────┐
│ Inbound calls come to campaign manager cloud                    │
│                            850                                  │
└─────────────────────────────────────────────────────────────────┘
                                │
                                ▼
┌─────────────────────────────────────────────────────────────────┐
│ Calls redirected to agents of contact center or contact center  │
│ cloud specified by enterprise customer representative           │
│                            860                                  │
└─────────────────────────────────────────────────────────────────┘
```

Fig. 8

DUAL-PRONG CALL PROGRESS ASSESSMENT AND ROUTING

CROSS-REFERENCE TO RELATED APPLICATIONS

Priority is claimed in the application data sheet to the following patents or patent applications, each of which is expressly incorporated herein by reference in its entirety:
Ser. No. 18/147,663
Ser. No. 17/828,616
Ser. No. 17/571,526
Ser. No. 17/348,545
Ser. No. 63/130,014

BACKGROUND OF THE INVENTION

Field of the Art

The disclosure relates to the field of call center technology, and more particularly to the field of contact campaign management for non-bifurcated consent-based lists of end-users.

Discussion of the State of the Art

In the contact center industry, certain legislation, and regulations such as the Telephone Consumer Protection Act ("TCPA") provide requirements for contact center compliance from the Federal government, which offer protection to consumers and restrict unwanted calls in a number of ways. In particular, the TCPA mandates prior expressed written consent ("PEWC") from consumers before dialing them using an auto-dialing system. For commercial, advertisement, and for-profit purposes, the TCPA restricts the making of telemarketing calls and the use of auto-dialers, artificial or pre-recorded voice messages for non-PEWC customers. The TCPA also no longer allows telemarketers to use an "established business relationship" to avoid getting consent from consumers and requires the caller to provide an automated, interactive "opt-out" mechanism during each auto-dialed call.

A large number of Business Process Outsourcing ("BPO") and collection agencies are contracted to dial calls on behalf of enterprise clients. Because the enterprise clients may not have PEWC for the end customers, the enterprises are refrained from using predictive dialers or automated calling services to contact the customers, thus impacting agent and organization productivity. Further, enterprises which operate their own contact centers run into a similar constraint when calling their customers with phone numbers that are in their records, but which are not recorded as having a PEWC.

Some organizations in the market today offer a solution where the enterprise customer is asked to split their end customer records and offer it as two distinct lists, one being a list with PEWC and one being a list of non-PEWC end customers. The list of PEWC end customers is dialed by a predictive auto-dialer platform which is handled by one set of agents. The other list, with phone numbers that have not given PEWC, is first sent to a group of agents who use software to click on the provided phone numbers and once clicked, the number goes to an auto-dialer and those calls get initiated and connected to another group of agents dedicated and connected to this separate dialer system.

Traditional call progress assessment (CPA) implementations rely on simple rule-based algorithms which provide sub-optimal accuracy of speed of processing, leading to significant inefficacies in operations and issues in meeting compliance from new government regulations.

What is a needed is a system and method for providing enhanced call progress assessment using dual-prong analysis.

SUMMARY OF THE INVENTION

Accordingly, the inventor has conceived and reduced to practice, a system and method for enhanced call progress assessment (CPA) utilizing dual-prong analysis, comprising a campaign management console, a data services engine, a traffic shaper, an agent desktop, an optimized CPA service, an auto-dialer with built-in CPA capabilities, and a simple dialer which allows enterprises to process outbound calls in parallel in order to quickly and accurately determine outbound call outcome, a live person or an answering machine or service, which can be used to route outbound calls in an appropriate manner. The system and method utilize a plurality of specialized CPA methods running in parallel to a built-in CPA system to analyze audio stream data associated with an outbound call and uses various entity-specific threshold parameters to determine a call outcome based on the results of the plurality of CPA methods. Such a system and method can provide faster and more accurate CPA using a dual prong approach.

According to a first preferred embodiment, a system for dual-prong call progress assessment and routing, comprising: an auto-dialer comprising a first plurality of programming instructions stored in a memory of, and operating on a processor of, a computer system, wherein the first plurality of programming instructions, when operating on the at least one processor, causes the computer system to: establish an outbound call to a dialed number; send data associated with the outbound call to a call progress assessment service; receive a status indicator from the call progress assessment service; based on the status indicator: process the data associated with the outbound call to determine a call progress assessment, using a plurality of rules for classifying the data as either having a live person connected or as having an answering machine connected; determine whether a live person is expected or whether an answering machine is expected; if a live person is expected, route the outbound call to an available contact center agent; and if an answering machine is expected, route the outbound call to an interactive voice response system, is disclosed.

According to a second preferred embodiment, a method for dual-prong call progress assessment and routing, comprising the steps of: establishing, using an auto-dialer, an outbound call to a dialed number; sending data associated with the outbound call to a call progress assessment service; receiving a status indicator from the call progress assessment service; based on the status indicator: processing the data associated with the outbound call to determine a call progress assessment, using a plurality of rules for classifying the data as either having a live person connected or as having an answering machine connected; determining whether a live person is expected or whether an answering machine is expected; if a live person is expected, routing the outbound call to an available contact center agent; and if an answering machine is expected, routing the outbound call to an interactive voice response system, is disclosed.

According to various aspects; wherein the agent desktop has no audio communications capabilities; wherein the one or more call progress analysis methods comprises at least one of energy analysis, entropy analysis, fingerprint analysis, AMD metadata analysis, and real-time speech analysis;

the predetermined time period threshold is set by an administrator of an enterprise; wherein the predetermined confidence threshold is set by an administrator of an enterprise; wherein the agent desktop has audio communications capabilities, and the tethered connection established by the auto-dialer is established with a contact center agent operating the agent desktop; wherein all non-prior express written consent customer records are dialed with a simple dialer rather than an auto-dialer, wherein the agent desktop interaction with the at least one non-prior express written consent customer record forwards the customer record with a corresponding phone number to a simple dialer; and further including the steps of: receiving a forwarded non-prior express written consent customer record; dialing the forwarded customer number; and establishing a tethered connection between a prior express written consent customer record and one or more communication devices, after dialing a number; wherein the campaign management console, auto-dialer, simple dialer, and agent desktop, are all operated as separate services communicating over a Wide Area Network; wherein the campaign management console, auto-dialer, simple dialer, and agent desktop, are all operated as services managed through a single cloud service provider, connected to clients over a Wide Area Network and Public Switched Telephone Network.

BRIEF DESCRIPTION OF THE DRAWING FIGURES

The accompanying drawings illustrate several aspects and, together with the description, serve to explain the principles of the invention according to the aspects. It will be appreciated by one skilled in the art that the particular arrangements illustrated in the drawings are merely exemplary and are not to be considered as limiting of the scope of the invention or the claims herein in any way.

FIG. 5 is a method diagram illustrating further steps taken by a system for unified autodial campaign management, according to one embodiment, illustrating steps for facilitating tethered connections between agent desktops and an auto-dialer and the customer reached by an auto-dialer, and the interaction of agent desktop software with customer records to determine the customers to contact and connect with specific agents.

Figure 6:
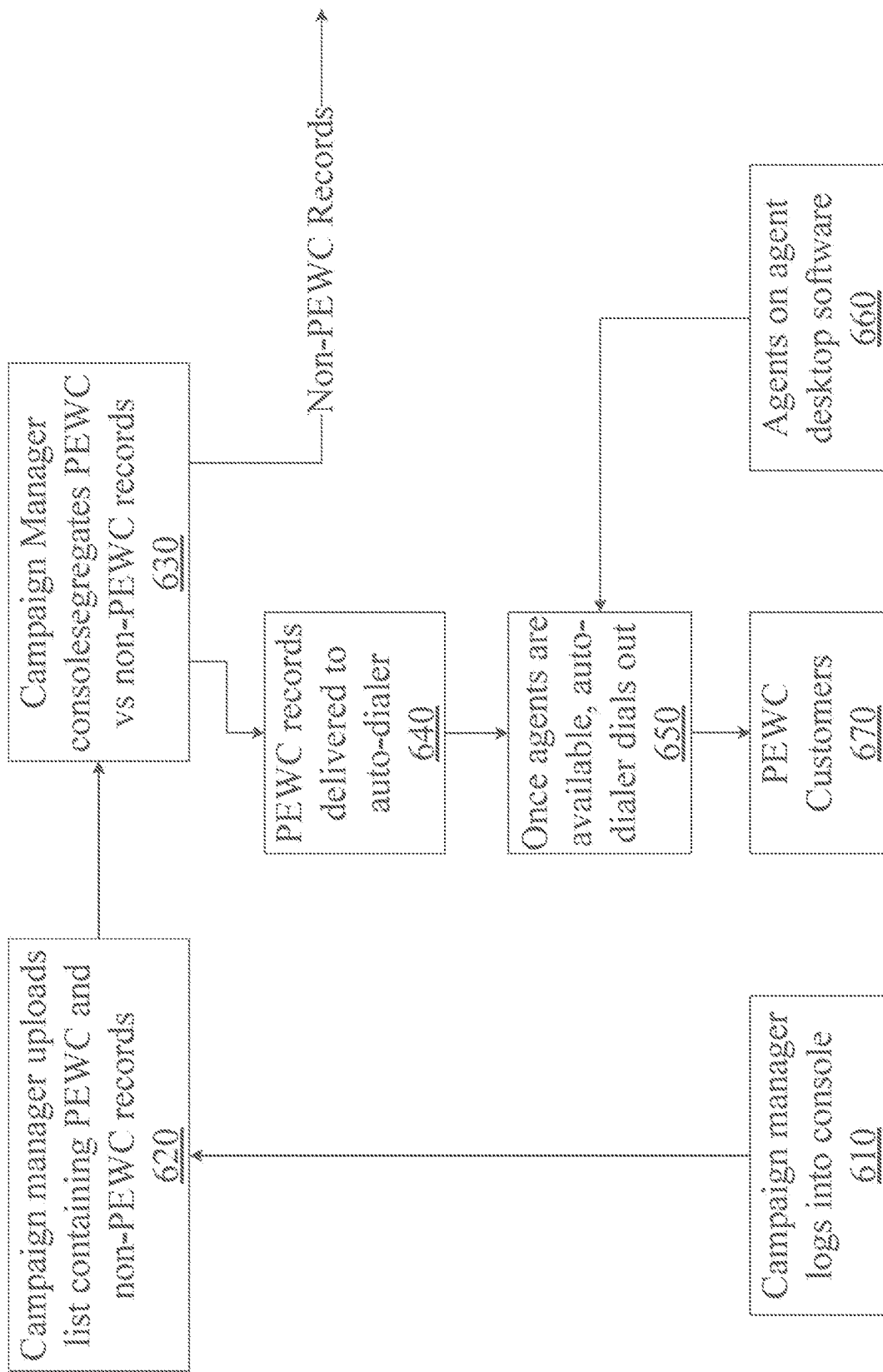

FIG. 6 is a directional method diagram similar to a flowchart, illustrating steps taken by a system for unified autodial campaign management, according to one embodiment.

Figure 7:
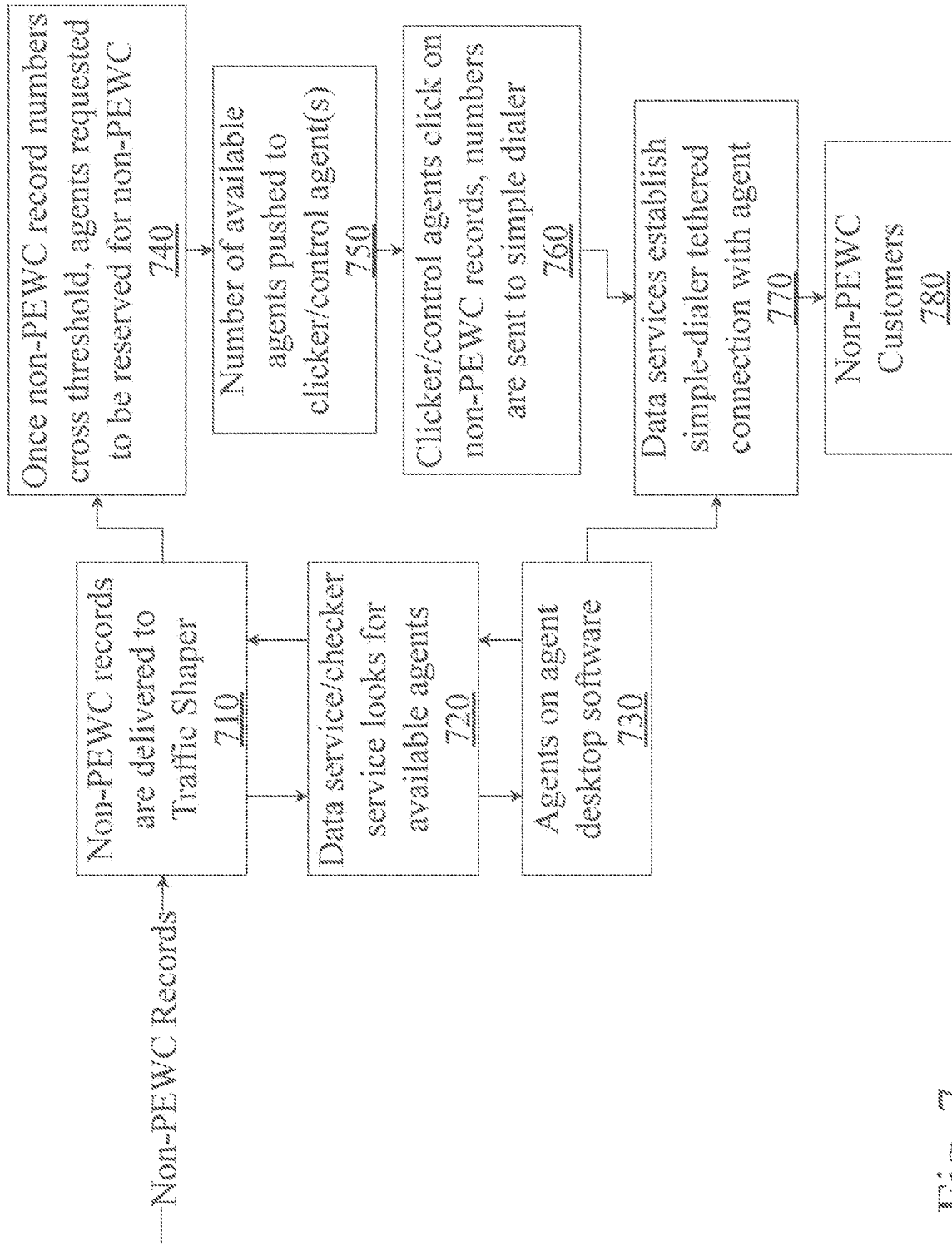

FIG. 7 is a second half of a directional method diagram similar to a flowchart, illustrating steps taken by a system for unified autodial campaign management, according to one embodiment.

FIG. 8 is a method diagram illustrating an enterprise representative operating a campaign manager console to centrally manage a unified autodial campaign, according to an aspect.

Figure 9:
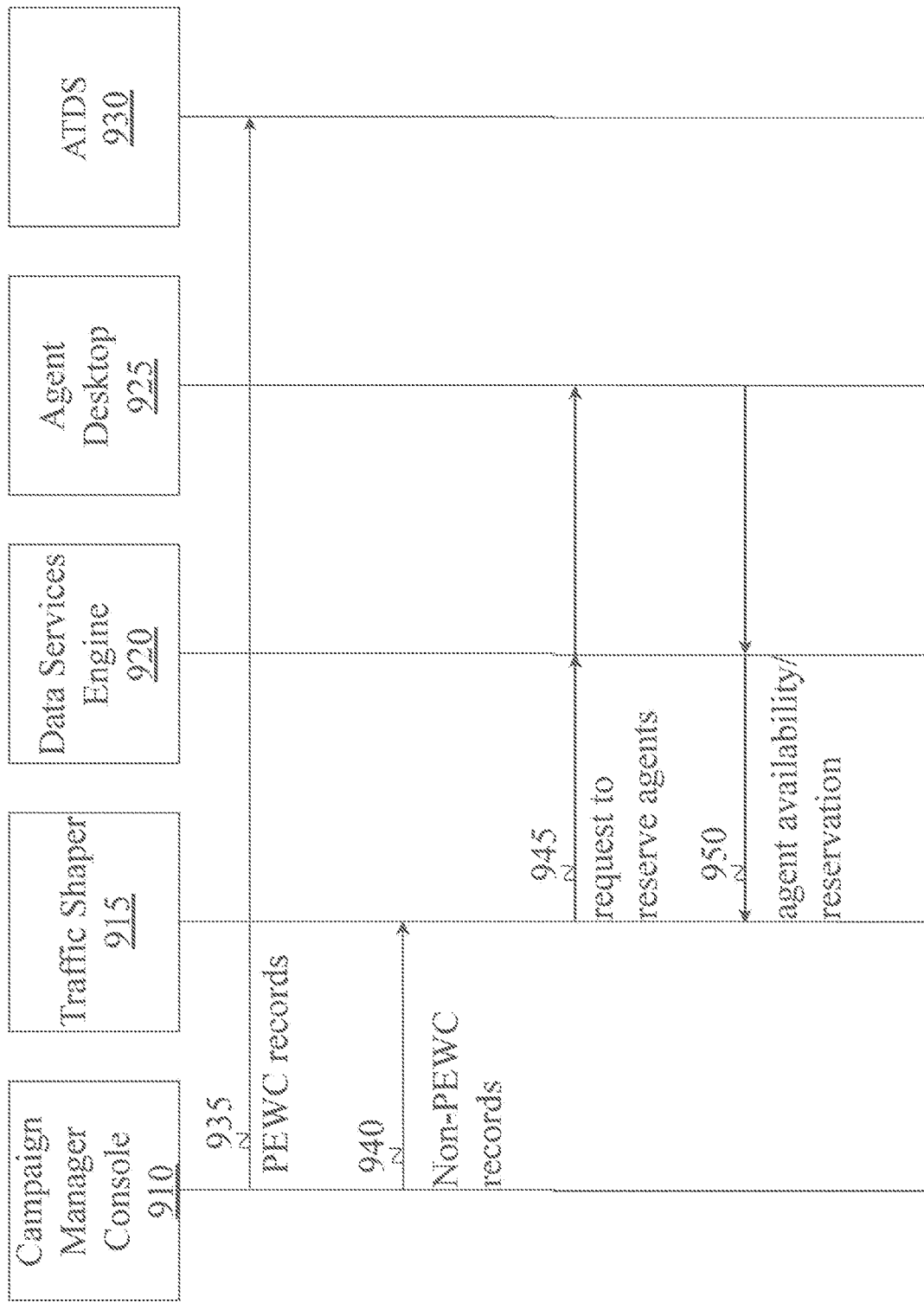

FIG. 9 is a message flow diagram illustrating steps taken by a system for unified autodial campaign management, according to one embodiment, illustrating steps for the processing of customer record lists, segregation of such a list based on PEWC status, and dealing with the segregated records.

Figure 10:
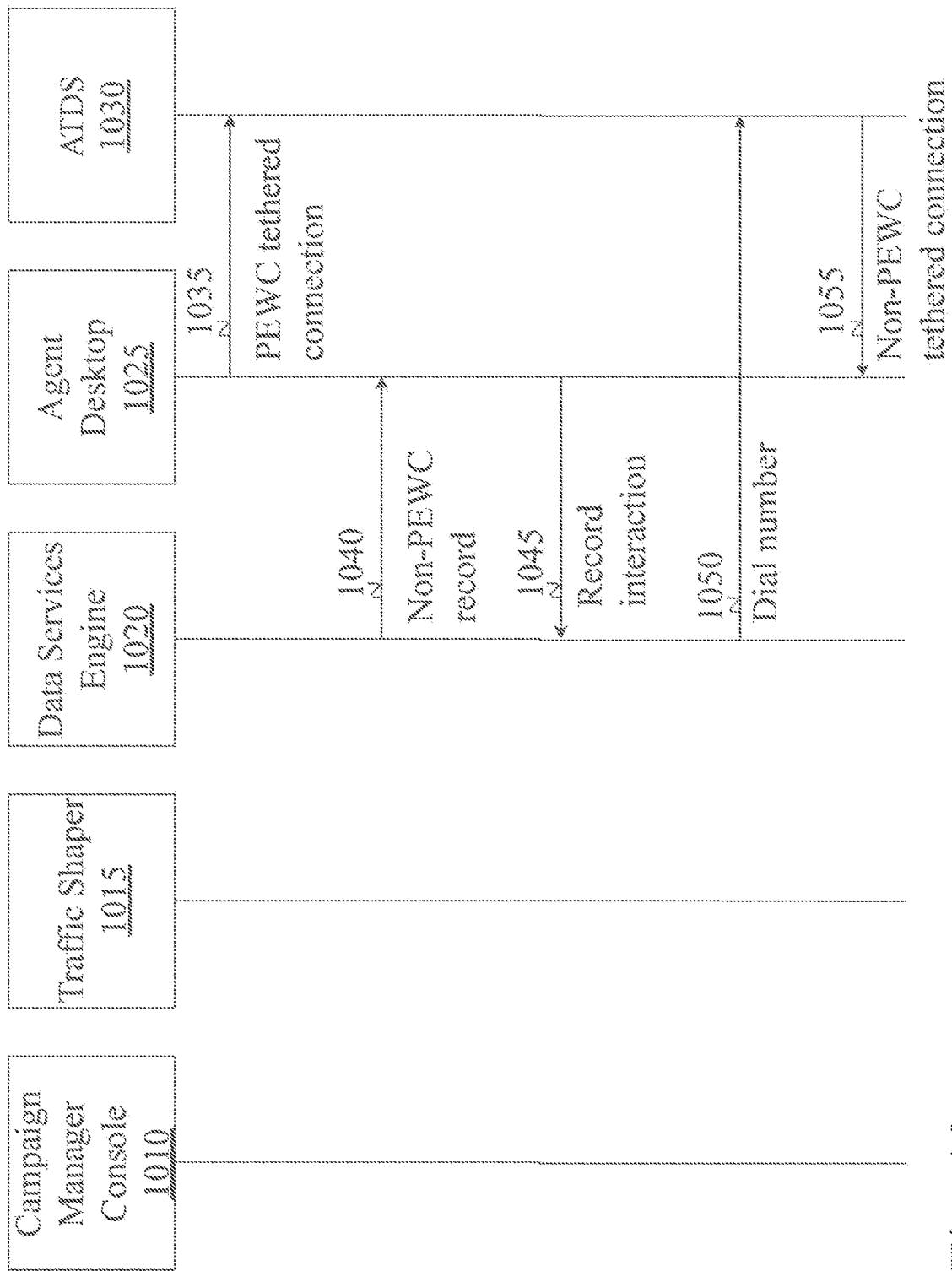

FIG. 10 is a message flow diagram illustrating further steps taken by a system for unified autodial campaign management, according to one embodiment, illustrating steps for facilitating tethered connections between agent desktops and an auto-dialer and the customer reached by an auto-dialer, and the interaction of agent desktop software with customer records to determine the customers to contact and connect with specific agents.

Figure 11:
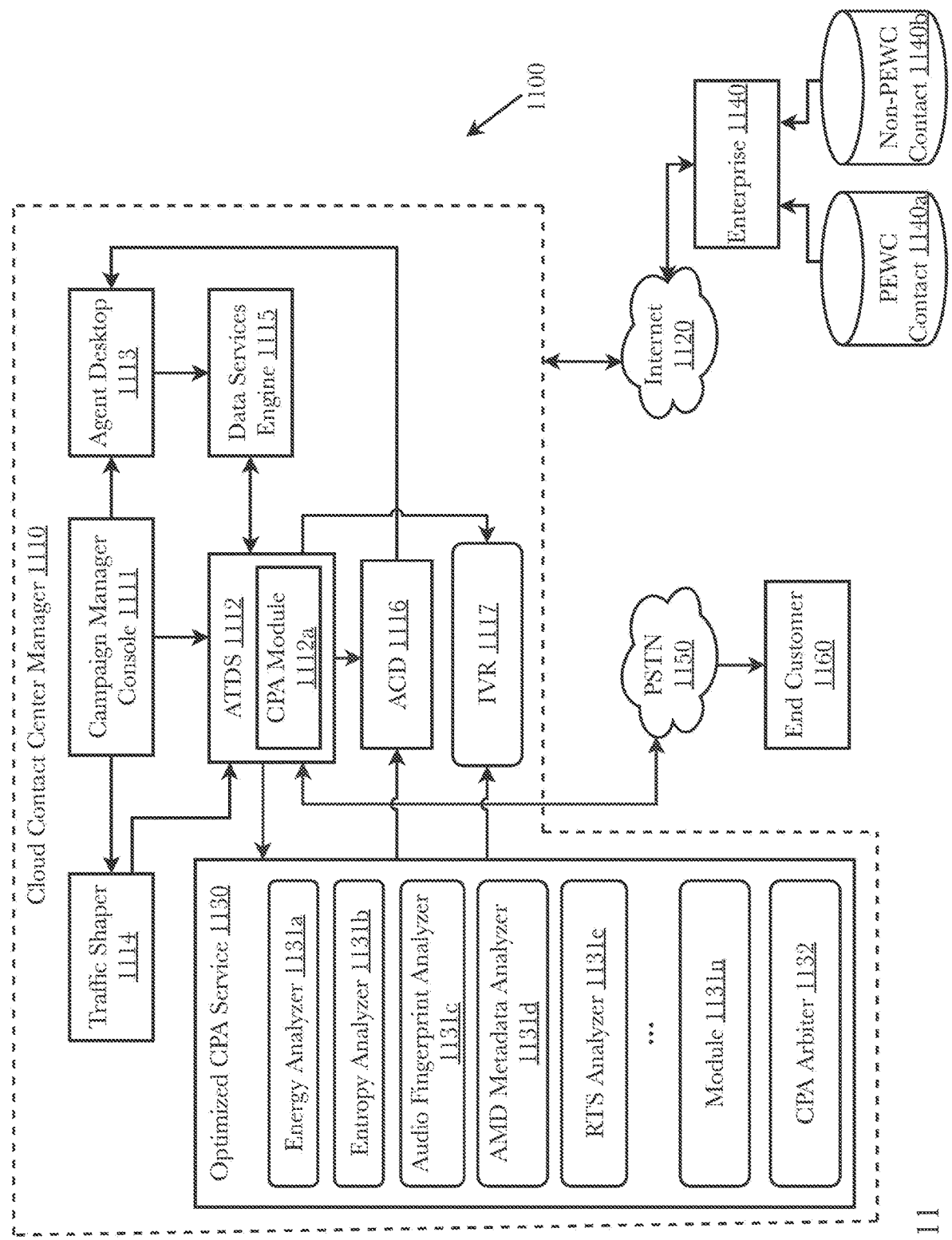

FIG. 11 is a block diagram illustrating an exemplary system architecture for dual-prong call progress assessment for outbound telephone dialing wherein the system components are arranged locally in an a given location, according to an embodiment.

Figure 12:
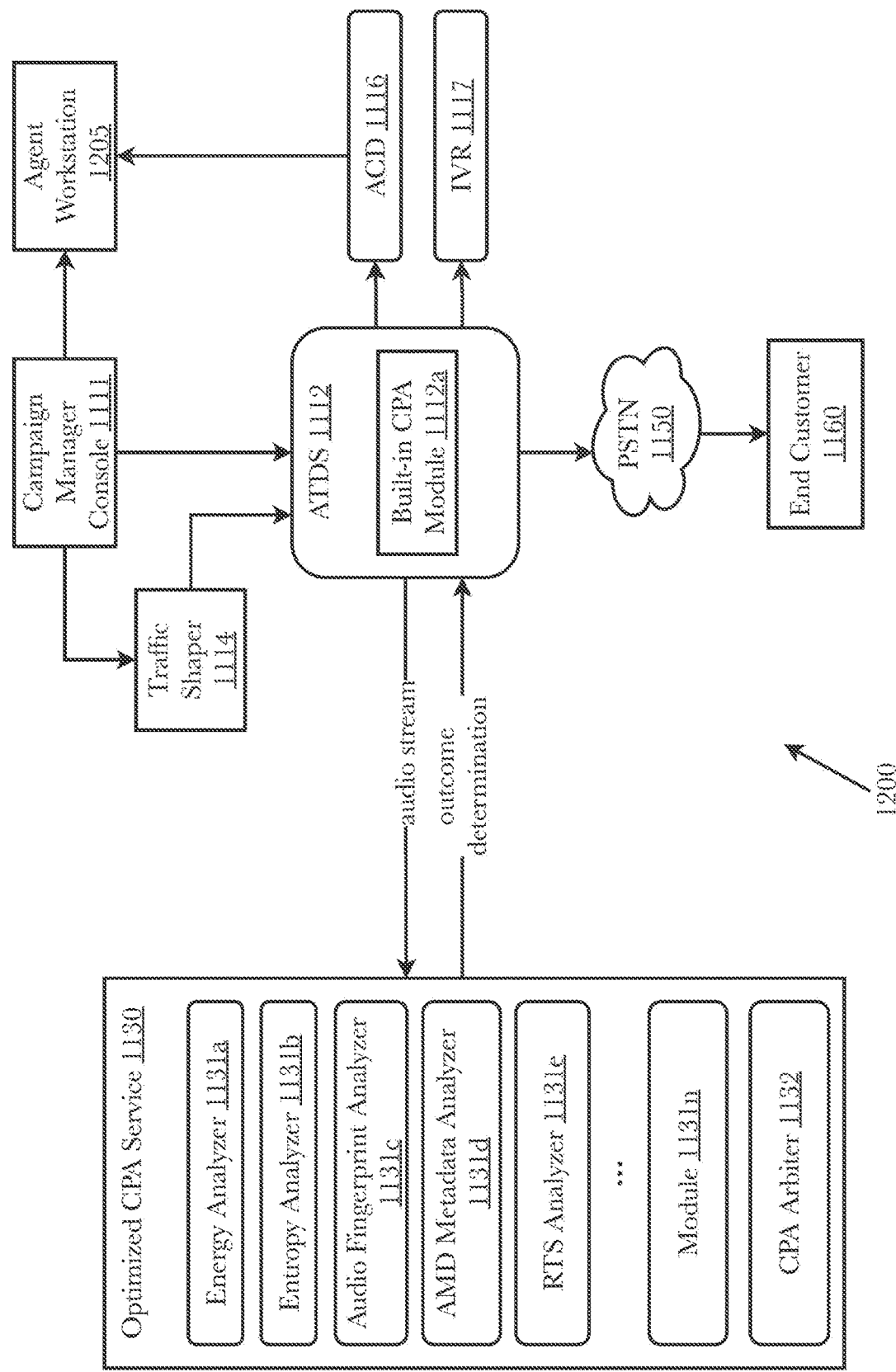

FIG. 12 is a block diagram illustrating an exemplary system architecture for dual-prong call progress assessment for outbound telephone dialing wherein the system components are in a distributed arrangement, according to an embodiment.

Figure 13:
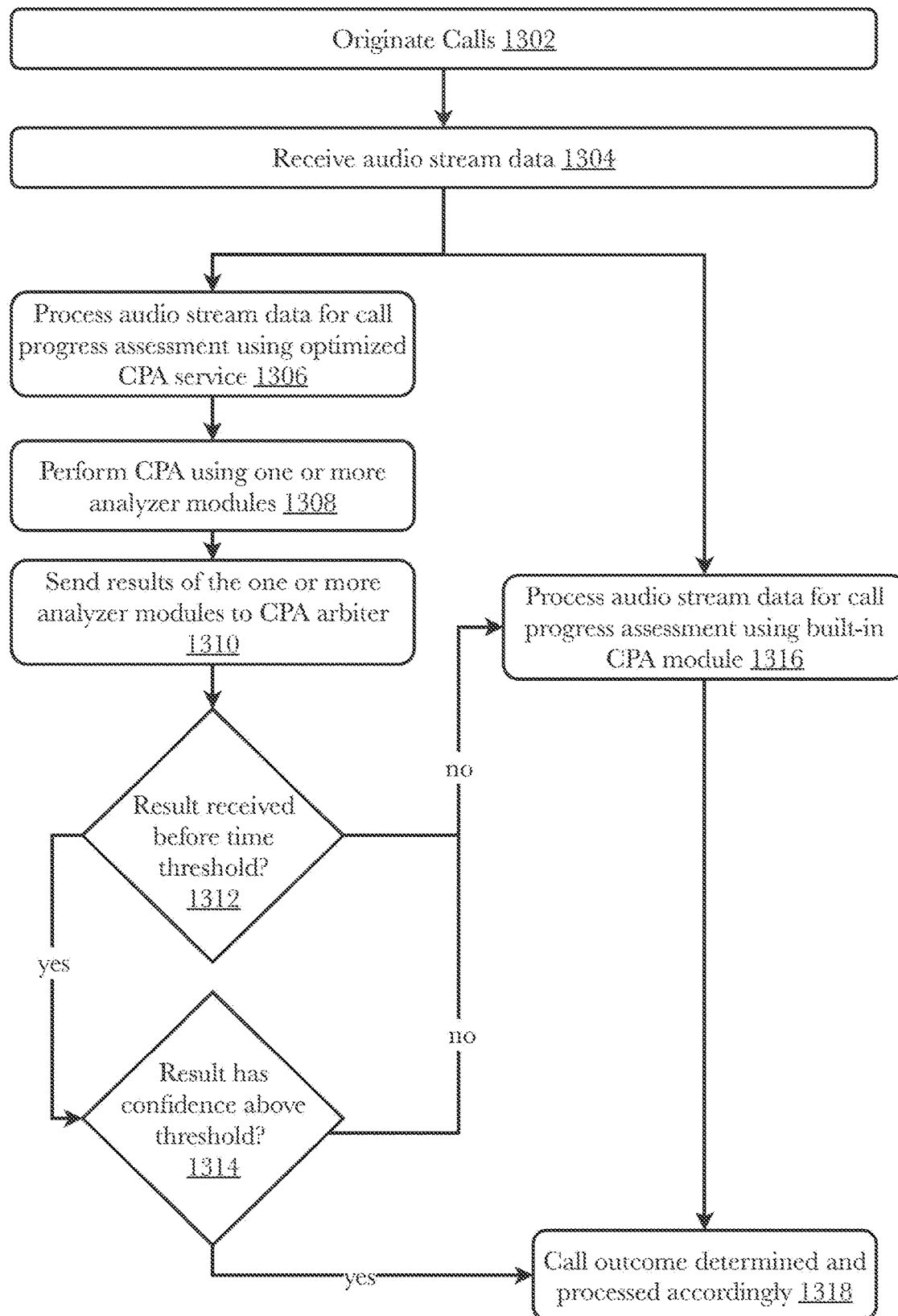

FIG. 13 is a flow diagram illustrating an exemplary method for providing dual-prong call progress assessment for outbound telephone dialing, according to an aspect.

Figure 14:
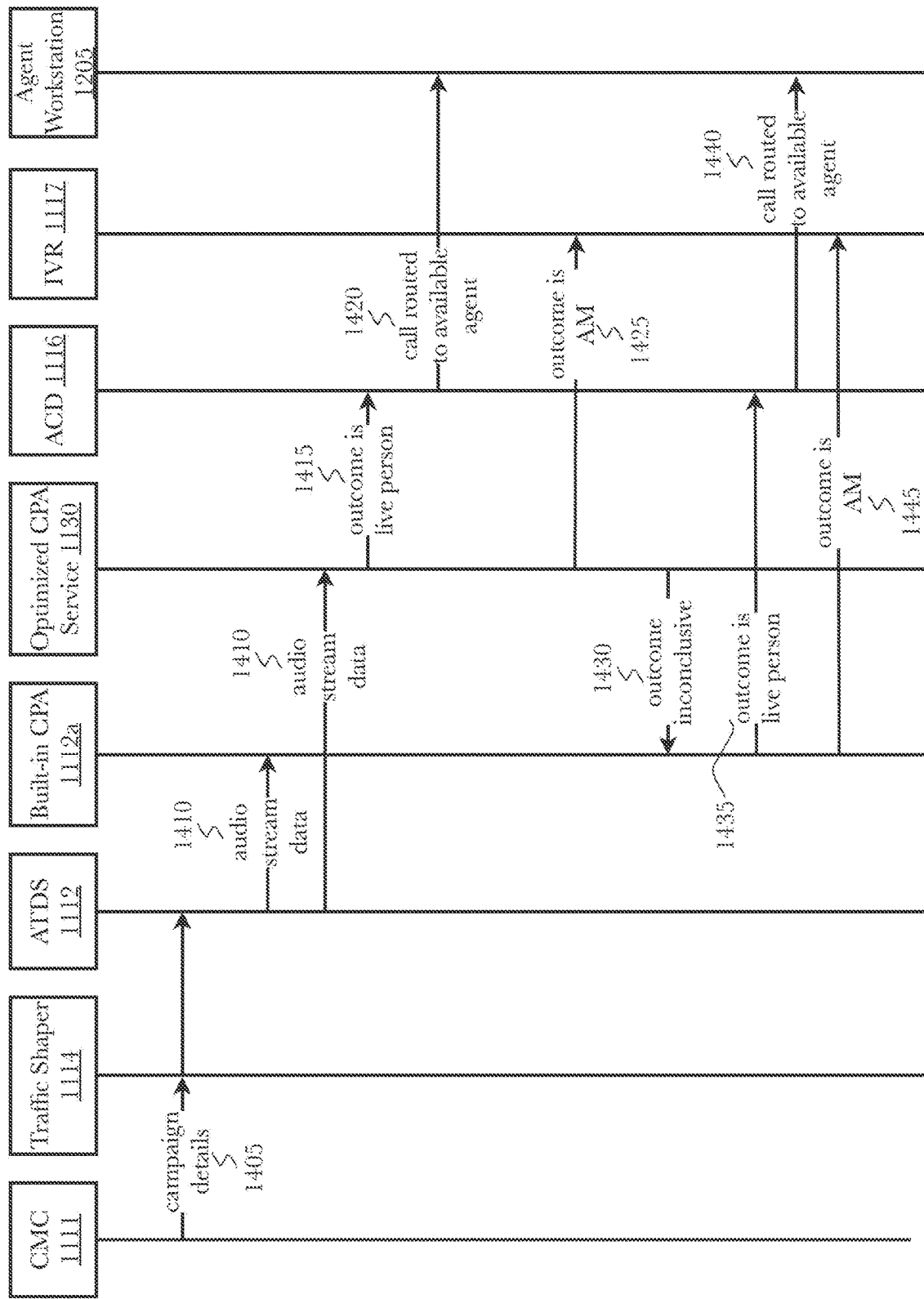

FIG. 14 is a message flow diagram illustrating further steps taken by a system for dual-prong call progress assessment for outbound telephone dialing, according to an aspect, illustrating steps for facilitating parallel call progress assessment using an optimized CPA service and a built-in CPA module.

Figure 15:
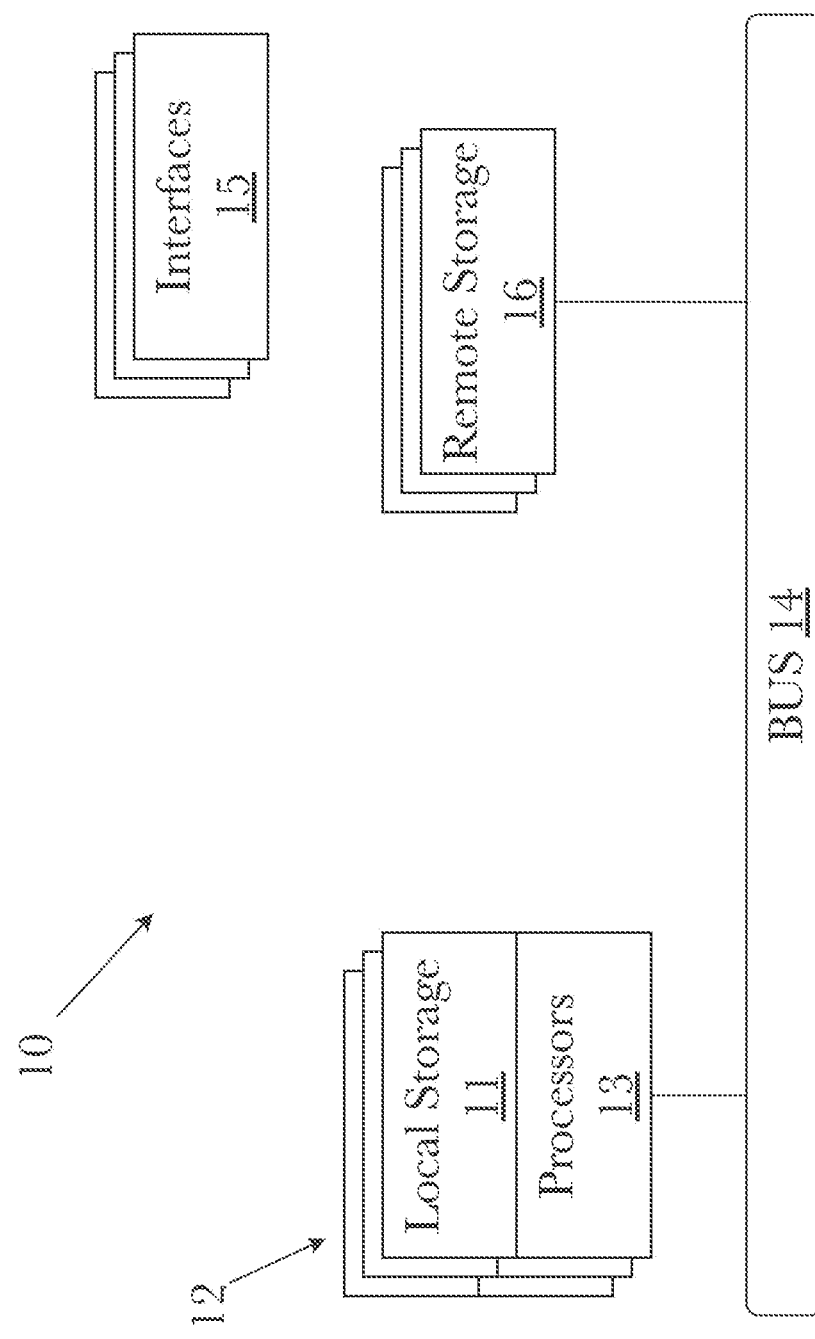

FIG. 15 is a block diagram illustrating an exemplary hardware architecture of a computing device.

Figure 16:
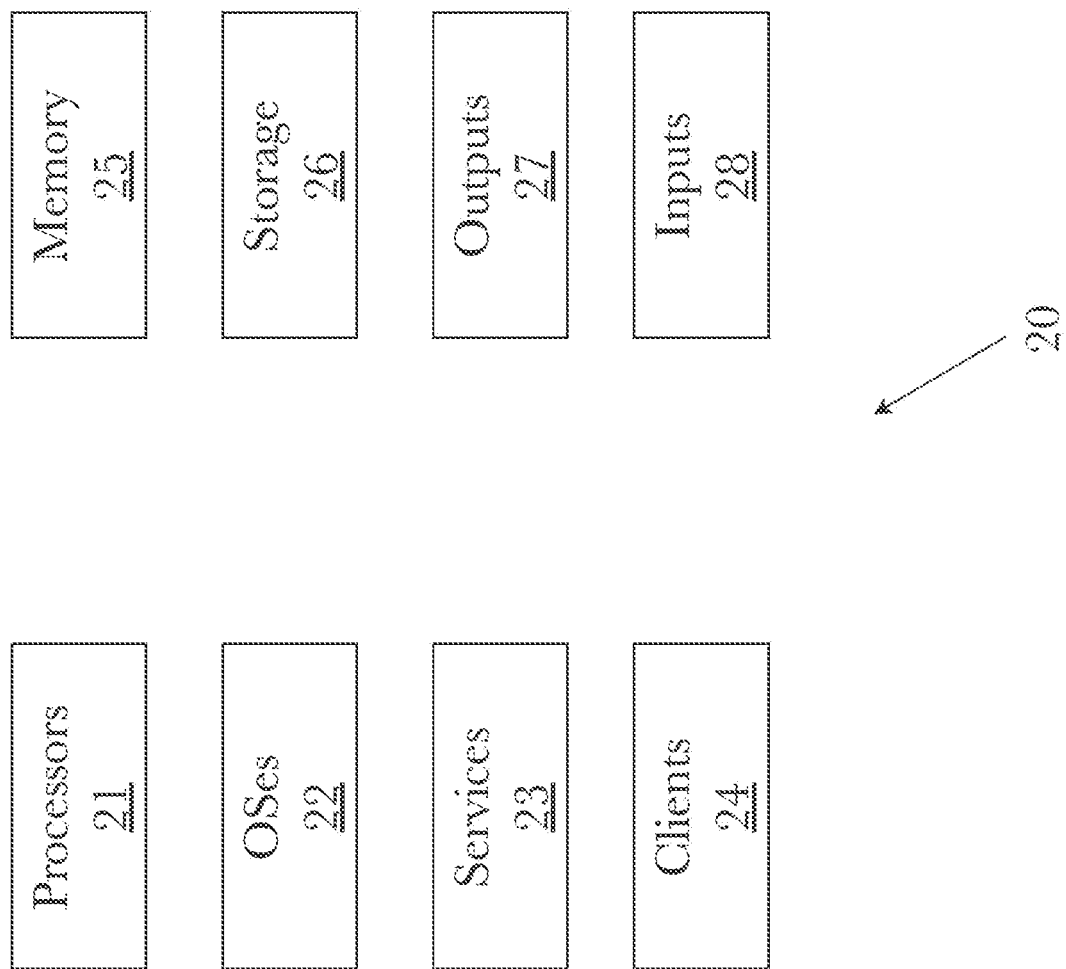

FIG. 16 is a block diagram illustrating an exemplary logical architecture for a client device.

Figure 17:
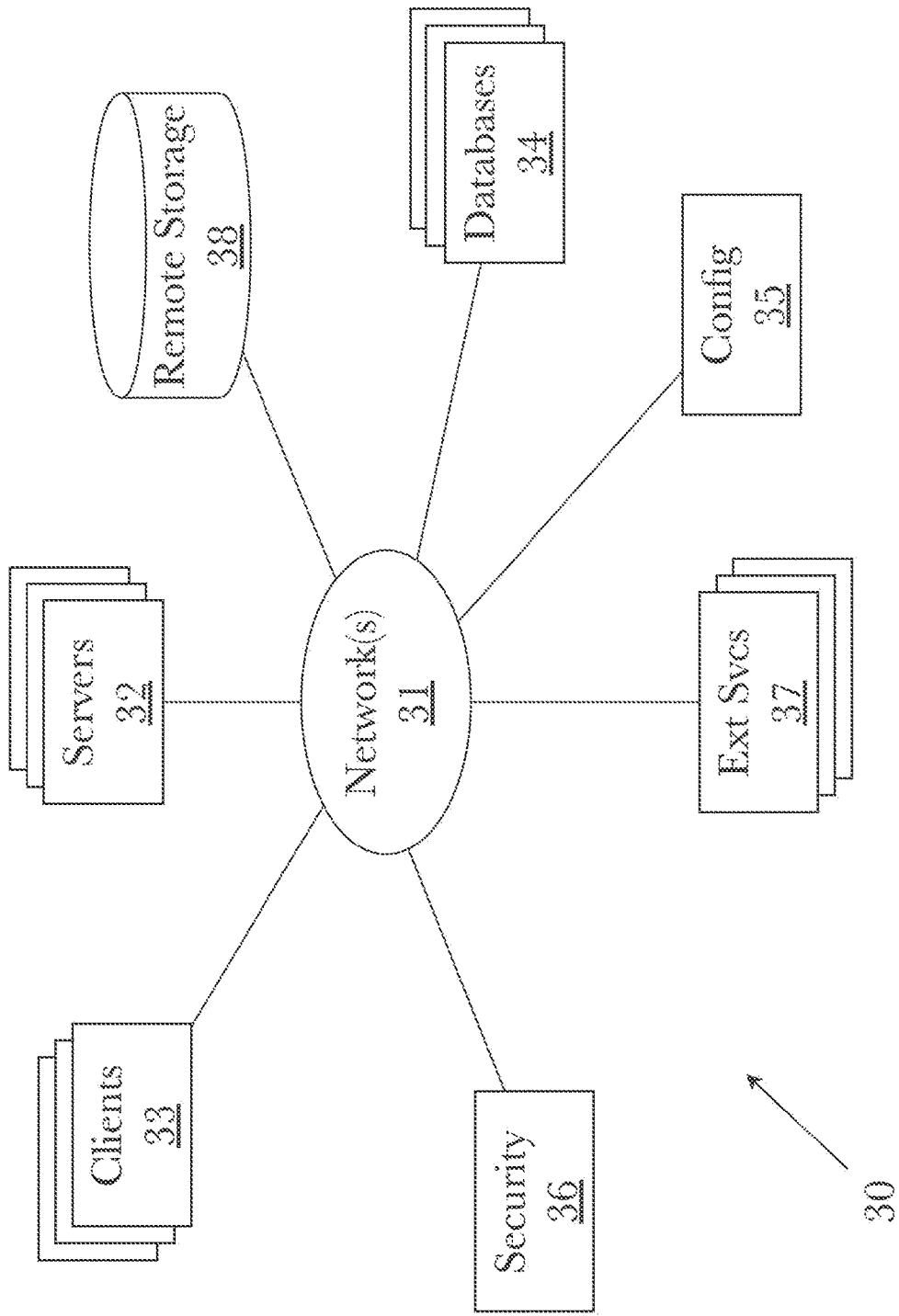

FIG. 17 is a block diagram showing an exemplary architectural arrangement of clients, servers, and external services.

Figure 18:
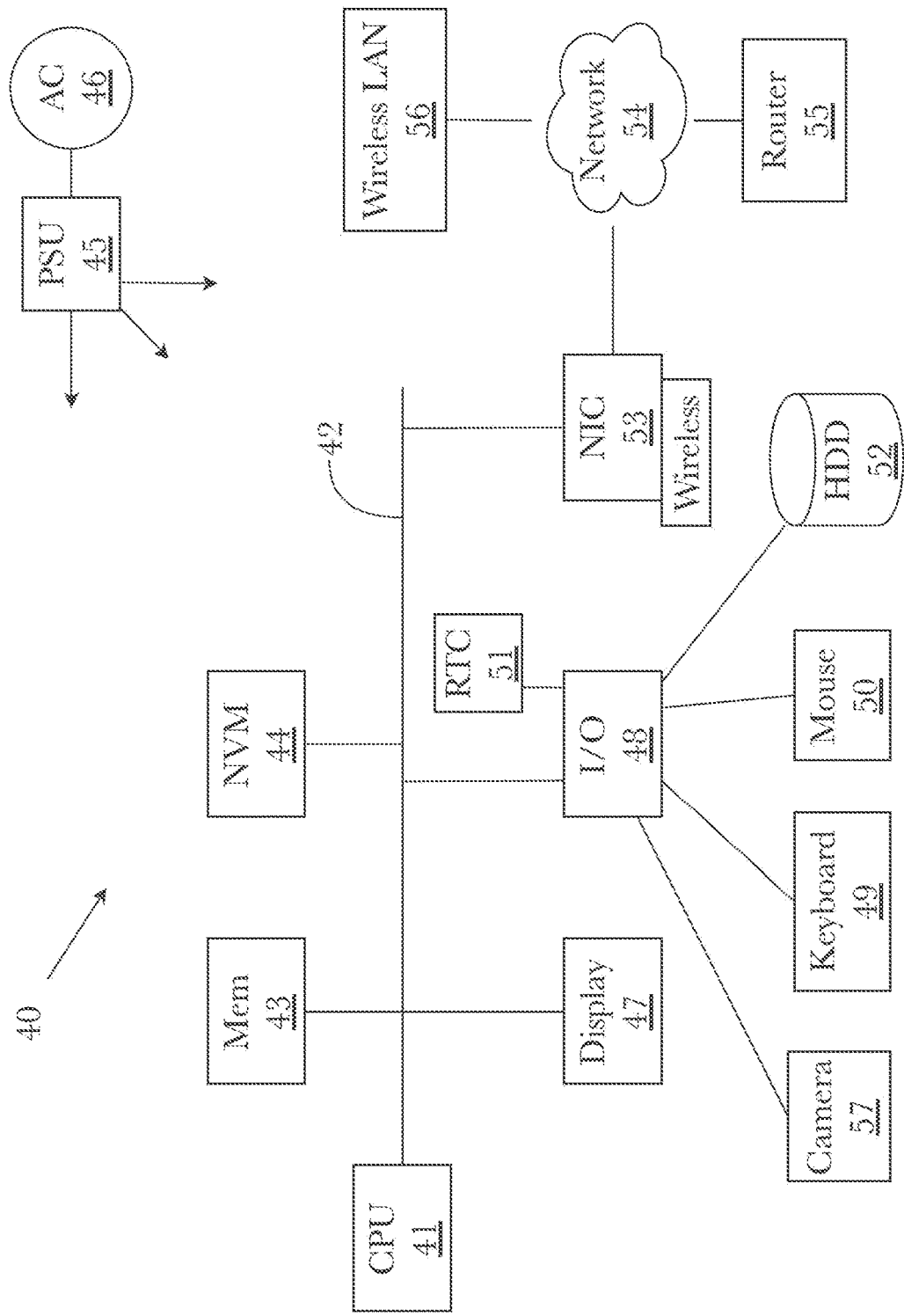

FIG. 18 is another block diagram illustrating an exemplary hardware architecture of a computing device.

DETAILED DESCRIPTION OF THE INVENTION

The inventor has conceived, and reduced to practice, a system and method for enhanced call progress assessment (CPA) utilizing dual-prong analysis, comprising a campaign management console, a data services engine, a traffic shaper, an agent desktop, an optimized CPA service, an auto-dialer with built-in CPA capabilities, and a simple dialer which allows enterprises to process outbound calls in parallel in order to quickly and accurately determine outbound call outcome, a live person or an answering machine or service, which can be used to route outbound calls in an appropriate manner. The system and method utilize a plurality of specialized CPA methods running in parallel to a built-in CPA system to analyze audio stream data associated with an outbound call and uses various entity-specific threshold parameters to determine a call outcome based on the results of the plurality of CPA methods. Such a system and method can provide faster and more accurate CPA using a dual prong approach.

One or more different aspects may be described in the present application. Further, for one or more of the aspects described herein, numerous alternative arrangements may be described; it should be appreciated that these are presented for illustrative purposes only and are not limiting of the aspects contained herein or the claims presented herein in any way. One or more of the arrangements may be widely applicable to numerous aspects, as may be readily apparent from the disclosure. In general, arrangements are described in sufficient detail to enable those skilled in the art to practice one or more of the aspects, and it should be appreciated that other arrangements may be utilized and that structural, logical, software, electrical and other changes may be made without departing from the scope of the particular aspects. Particular features of one or more of the aspects described herein may be described with reference to one or more particular aspects or figures that form a part of the present disclosure, and in which are shown, by way of illustration, specific arrangements of one or more of the aspects. It should be appreciated, however, that such features are not limited to usage in the one or more particular aspects or figures with reference to which they are described. The present disclosure is neither a literal description of all arrangements of one or more of the aspects nor a listing of features of one or more of the aspects that must be present in all arrangements.

Headings of sections provided in this patent application and the title of this patent application are for convenience only and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an aspect with several components in communication with each other does not imply that all such components are required. To the contrary, a variety of optional components may be described to illustrate a wide variety of possible aspects and in order to more fully illustrate one or more aspects. Similarly, although process steps, method steps, algorithms or the like may be described in a sequential order, such processes, methods, and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the aspects, and does not imply that the illustrated process is preferred. Also, steps are generally described once per aspect, but this does not mean they must occur once, or that they may only occur once each time a process, method, or algorithm is carried out or executed. Some steps may be omitted in some aspects or some occurrences, or some steps may be executed more than once in a given aspect or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other aspects need not include the device itself.

Techniques and mechanisms described or referenced herein will sometimes be described in singular form for clarity. However, it should be appreciated that particular aspects may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of various aspects in which, for example, functions may be executed out of order from that shown or discussed, including substantially concurrently or in reverse order, depending on the functionality involved, as would be understood by those having ordinary skill in the art.

Definitions

"Artificial intelligence" or "AI" as used herein means a computer system or component that has been programmed in such a way that it mimics some aspect or aspects of cognitive functions that humans associate with human intelligence, such as learning, problem solving, and decision-making. Examples of current AI technologies include understanding human speech, competing successfully in strategic games such as chess and Go, autonomous operation of vehicles, complex simulations, and interpretation of complex data such as images and video.

"Machine learning" as used herein is an aspect of artificial intelligence in which the computer system or component can modify its behavior or understanding without being explicitly programmed to do so. Machine learning algorithms develop models of behavior or understanding based on information fed to them as training sets, and can modify those models based on new incoming information. An example of a machine learning algorithm is AlphaGo, the first computer program to defeat a human world champion in the game of Go. AlphaGo was not explicitly programmed to play Go. It was fed millions of games of Go, and developed its own model of the game and strategies of play.

"Neural network" as used herein means a computational model, architecture, or system made up of a number of simple, highly interconnected processing elements which process information by their dynamic state response to external inputs, and is thus able to "learn" information by recognizing patterns or trends. Neural networks, also sometimes known as "artificial neural networks" are based on our understanding of the structure and functions of biological neural networks, such as the brains of mammals. A neural network is a framework for application of machine learning algorithms.

"Simple dialer" or "accelerated dialer" as used herein means a software system that may complete the dialing of a phone number, on-request, when it is given the phone number for dialing, such as from manual human selection of the number. This is in contrast to an auto-dialer or automatic dialing system, which programmatically or automatically finds the numbers to dial and dials them without human interaction, which is restricted in some legal systems in certain situations.

Conceptual Architecture

Figure 1:
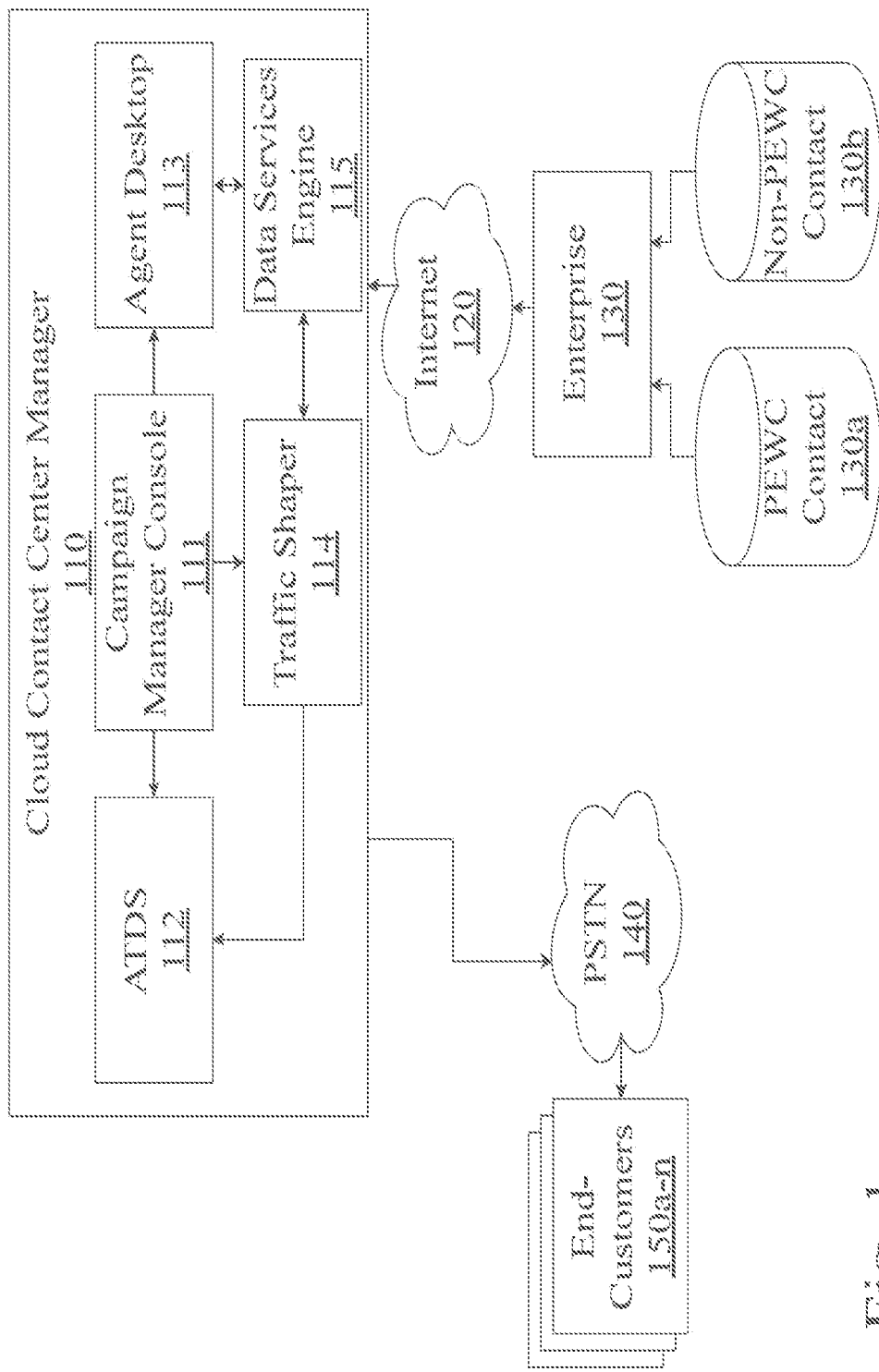
FIG. 1 is a block diagram illustrating an exemplary system architecture for unified autodial campaign management, according to one embodiment, showing a singular cloud architecture with numerous components to operate the system.

FIG. 1 is a block diagram illustrating an exemplary system architecture for unified autodial campaign management, according to one embodiment, showing a singular cloud architecture with numerous components to operate the system. Cloud contact center manager 110, which constitutes a cloud service managing several software and hardware components including a campaign manager console 111, an Automatic Telephone Dialing System ("ATDS") 112, agent desktop software 113, a traffic shaper 114 engine, and a data services engine 115. Such services may be accessed independently or through a campaign manager console 111, which may constitute a software application or applications running on a single server, a plurality of servers, or in a third-party cloud service, that may connect with users either physically at a terminal or across a network connection. Such a network connection may be a Local Area Connection ("LAN") or a Wide Area Connection ("WAN") such as the Internet 120, and may use any of a variety of protocols including SSH, Telnet, TCP/IP, UDP, and others. The campaign manager console 111 or "CMC" may be configured to be a centrally access point for users and administrators to access other parts of a cloud contact center manager 110, such as an ATDS 112 or traffic shaper 114, and may provide functionality for an administrator to create and manage a customer contact and autodialing campaign, including campaign duration, scope, customer records to contact, agent distribution and reservation settings, and agent integration with the system. Agent desktop software 113 may take the form of software operating on a virtual or physical desktop managed by the cloud system 110 that an agent uses to set their own information such as availability and reservation status, and interact with received customer records, which may be received either directly from a CMC 111 or from data services 115 that determine which agents to send which records after a traffic shaper 114 determines how to organize the traffic from customer records to agents. A traffic shaper 114 may be a separate component to a CMC, or may be software that operates as part of the CMC 111, and determines based on the specifications of the campaign from the CMC 111 when enough customer records of PEWC or non-PEWC status are available to start reserving and interacting with agents, and sends the records to a data services engine 115, potentially with data about which agents or section of agents may be preferred for which customer records or sections of customer records. Alternatively, the data services engine 115 may make this determination about which agents are relegated to which customer records. An administrator may be a member or representative of an enterprise 130, an enterprise being a user of the cloud contact center manager 110 to operate a customer contact campaign using the CMC 111 over a network such as the Internet 120. The enterprise 130 must upload in some format, a list of customer records, comprising either or both of PEWC and non-PEWC customer records 130a, 130b, either as separate lists or in one single combined list, though they must be marked or recorded as being PEWC or non-PEWC customer records if they are in a mingled list. The format of such a list may be raw text, a spreadsheet document, a comma separated value document, a database table, direct connection to a database, or some other format for sharing data that may be common in the art. The cloud contact center manager 110 may use, at some point during its operation, an ATDS 112 and/or agent desktop 113 to dial out to customers 150a-n, using a Public Switched Telephone Network ("PSTN") 140, using methods described herein.

Figure 2:
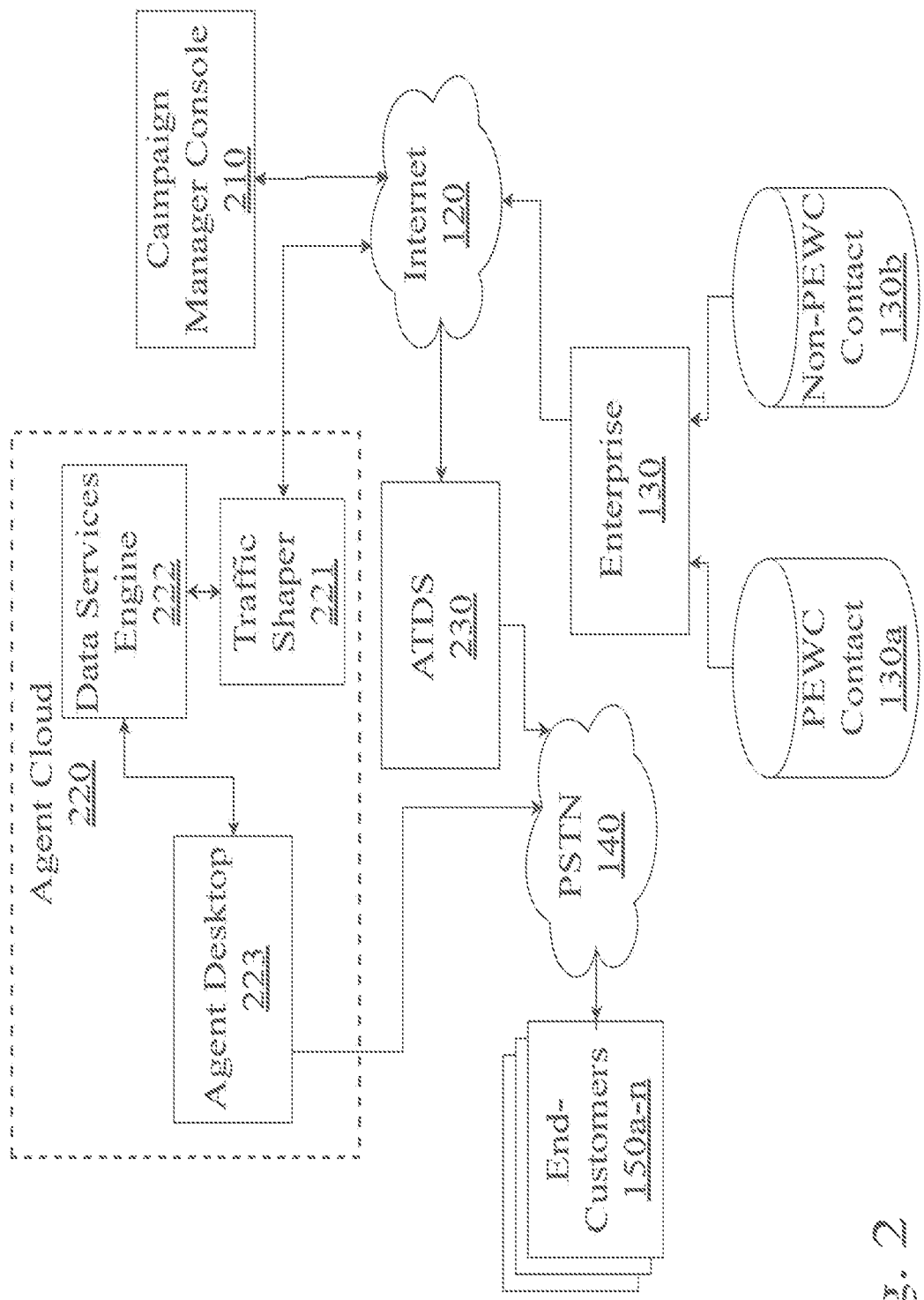
FIG. 2 is a block diagram illustrating an exemplary system architecture for unified autodial campaign management, according to one embodiment, showing a plurality of connected systems that may operate separately or in different cloud architectures.

FIG. 2 is a block diagram illustrating an exemplary system architecture for unified autodial campaign management, according to one embodiment, showing a plurality of connected systems that may operate separately or in different cloud architectures. Agent cloud 220, which constitutes a cloud service managing several software and hardware components including agent desktop software 223, a traffic shaper 221 engine, and a data services engine 222. Such services may be accessed independently or through the agent desktop software 223, or possibly through a console or user interface to manage the agent cloud 220 in alternative embodiments, which may constitute a software application or applications running on a single server, a plurality of servers, or in a third-party cloud service, that may connect with users either physically at a terminal or across a network connection. Such a network connection may be a Local Area Connection ("LAN") or a Wide Area Connection ("WAN") such as the Internet 120, and may use any of a variety of protocols including SSH, Telnet, TCP/IP, UDP, and others. A campaign manager console 210 or "CMC" may be configured to be a centrally access point for users and administrators to access or manage parts of an agent cloud 220 or other services, such as an ATDS 230, and may provide functionality for an administrator to create and manage a customer contact and autodialing campaign, including campaign duration, scope, customer records to contact, agent distribution and reservation settings, and agent integration with the system. Agent desktop software 223 may take the form of software operating on a virtual or physical desktop managed by the cloud system 220 that an agent uses to set their own information such as availability and reservation status, and interact with received customer records, which may be received either directly from a CMC 210 or from data services 222 that determine which agents to send which records after a traffic shaper 221 determines how to organize the traffic from customer records to agents. A traffic shaper 221 may be a separate component to an agent cloud, or may be software that operates as part of the data services engine 222, and determines based on the specifications of the campaign from the CMC 210 when enough customer records of PEWC or non-PEWC status are available to start reserving and interacting with agents, and sends the records to a data services engine 222, potentially with data about which agents or section of agents may be preferred for which customer records or sections of customer records. Alternatively, the data services engine 222 may make this determination about which agents are relegated to which customer records. An administrator may be a member or representative of an enterprise 130, an enterprise being a user of the agent cloud 220 and CMC 210 to operate a customer contact campaign using the CMC 210 over a network such as the Internet 120. The enterprise 130 must upload in some format, a list of customer records, comprising either or both of PEWC and non-PEWC customer records 130a, 130b, either as separate lists or in one single combined list, though they must be marked or recorded as being PEWC or non- PEWC customer records if they are in a mingled list. The format of such a list may be raw text, a spreadsheet document, a .csv, a database table, direct connection to a database, or some other format for sharing data that may be common in the art. The agent cloud 220 may communicate with, over a network such as the Internet 120, at some point during its operation, an ATDS 230 and agent desktop 223 to dial out to customers 150a-n, using a Public Switched Telephone Network ("PSTN") 140, using methods described herein.

According to an embodiment, this system configuration allows for a third-party agent cloud or a separately organized and configured agent cloud to be utilized, following a similar design pattern to a software engineering concept called "separation of concerns" in which logical separation and abstraction between components is preferable to closely-tied and integrated ones, that way components may be swapped out more easily, in some cases allowing for a "plug-n-play" architecture with certain components or services.

Figure 3:
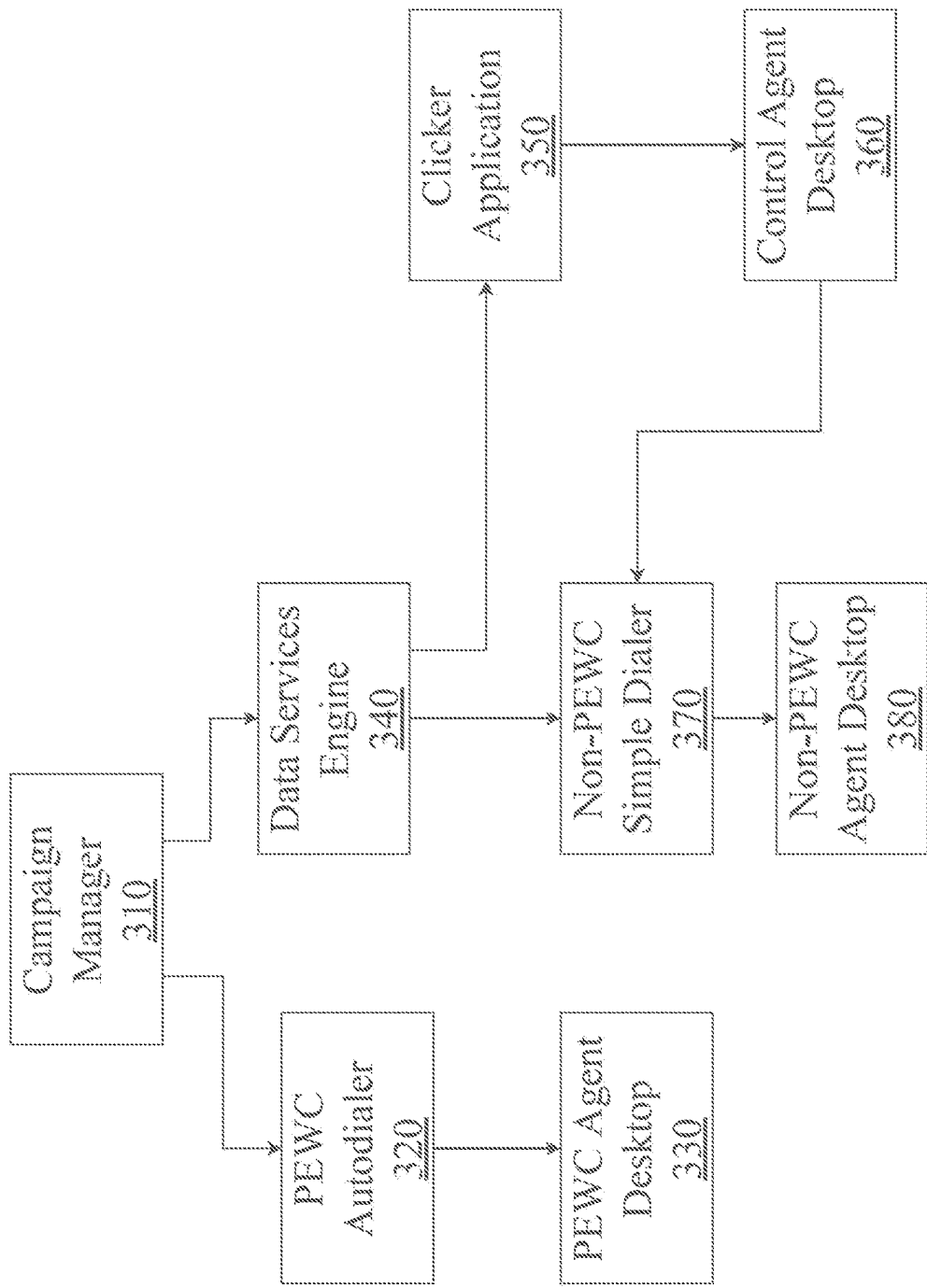
FIG. 3 is a block diagram illustrating an exemplary system architecture for unified autodial campaign management, according to one embodiment, showing a plurality of connected systems that may operate separately or in different cloud architectures, governed by or receiving input data from a single campaign manager service or console.

FIG. 3 is a block diagram illustrating an exemplary system architecture for unified autodial campaign management, according to one embodiment, showing a plurality of connected systems that may operate separately or in different cloud architectures, governed by or receiving input data from a single campaign manager service or console. According to a preferred embodiment, a campaign manager 310 is utilized to manage and arrange execution for a custom autodial campaign, using a data services engine 340 for non-PEWC customer records and a PEWC autodialer 320 is utilized for PEWC customer records. Such a campaign manager 310 may be a single software application or service, or multiple working in concert, over a network such as a Local Area Connection ("LAN") or a Wide Area Connection ("WAN") such as the Internet, and may use any of a variety of protocols including SSH, Telnet, TCP/IP, UDP, and others. The campaign manager 310 may be operated by an enterprise administrator or representative over a network or physically if it is hosted on a single computing device, to manage the entire campaign operation, with communication between components shown also being able to be accomplished either over a network or using inter-process communications, or even with certain components being part of the same computer process and merely listed separately to demonstrate logical separation but not physical separation between them. For PEWC customer records which are forwarded to a PEWC autodialer 320, the autodialer may dial the customers and establish a tethered connection to the customer with an agent using agent desktop software 330 that may be reserved by the autodialer itself 320 or by the campaign manager 310. For non-PEWC customer records which are forwarded to a data services engine 340, the records are made available to both a non-PEWC simple dialer 370 and a clicker application 350. The clicker application 350 works with control agent desktop software 360 that display, to specialized "control agents", non-PEWC customer records to click on using a graphical user interface, thereby informing the non-PEWC "simple dialer" 370 to dial that customer, therefore involving a human to start the dialing process, rather than a true automatic dialing. The dialed number is then tethered to an agent using non-PEWC agent desktop software 380, which may be different from the software for PEWC agents 330, or it may be the same software with the only difference being the manner in which the initial customer dialing takes place for the two branches.

FIG. 11 is a block diagram illustrating an exemplary system 1100 architecture for dual-prong call progress assessment (CPA) for outbound telephone dialing wherein the system components are arranged locally in an a given location, according to an embodiment. Cloud contact center manager 1110, which constitutes a cloud service managing several software and hardware components including a campaign manager console 1111, an Automatic Telephone Dialing System ("ATDS") 1112, agent desktop software 1113, an automatic call distribution (ACD) 1116 system, an interactive voice response (IVR) 1117 system, a traffic shaper 1114 engine, an optimized call progress assessment (CPA) service 1130 and a data services engine 1115. Such services may be accessed independently or through a campaign manager console 1111, which may constitute a software application or applications running on a single server, a plurality of servers, or in a third-party cloud service, that may connect with users either physically at a terminal or across a network connection. Such a network connection may be a Local Area Connection ("LAN") or a Wide Area Connection ("WAN") such as the Internet 1120, and may use any of a variety of protocols including SSH, Telnet, TCP/IP, UDP, and others. The campaign manager console 1111 or "CMC" may be configured to be a centrally access point for users and administrators to access other parts of a cloud contact center manager 1110, such as an ATDS 1112 or traffic shaper 1114, and may provide functionality for an administrator to create and manage a customer contact and autodialing campaign, including campaign duration, scope, customer records to contact, agent distribution and reservation settings, and agent integration with the system. Agent desktop software 11113 may take the form of software operating on a virtual or physical desktop managed by the cloud system 1110 that an agent uses to set their own information such as availability and reservation status, and interact with received customer records, which may be received either directly from a CMC 1111 or from data services 1115 that determine which agents to send which records after a traffic shaper 1114 determines how to organize the traffic from customer records to agents. A traffic shaper 1114 may be a separate component to a CMC, or may be software that operates as part of the CMC 111, and determines based on the specifications of the campaign from the CMC 1111 when enough customer records of PEWC or non-PEWC status are available to start reserving and interacting with agents, and sends the records to a data services engine 1115, potentially with data about which agents or section of agents may be preferred for which customer records or sections of customer records. Alternatively, the data services engine 1115 may make this determination about which agents are relegated to which customer records. An administrator may be a member or representative of an enterprise 11140, an enterprise being a user of the cloud contact center manager 1110 to operate a customer contact campaign using the CMC 1111 over a network such as the Internet 1120. The enterprise 1140 must upload in some format, a list of customer records, comprising either or both of PEWC and non-PEWC customer records 1140a, 1140b, either as separate lists or in one single combined list, though they must be marked or recorded as being PEWC or non-PEWC customer records if they are in a mingled list. The format of such a list may be raw text, a spreadsheet document, a comma separated value document, a database table, direct connection to a database, or some other format for sharing data that may be common in the art. The cloud contact center manager 110 may use, at some point during its operation, an ATDS 1112 and/or agent desktop 1113 to dial out to customers 1160, using a Public Switched Telephone Network ("PSTN") 1150, using methods described herein.

ACD 1116 system routes outbound calls and distributes them to an available agent. One purpose of the ACD 1116 is to help the contact center sort and manage outbound calls to an appropriate endpoint such as to an IVR 1117 for outbound calls determined to have been answered by an answering machine or service, or to an agent desktop/workstation 1113 for outbound calls determined to have been answered by a live person. ACD 1116 is configured to receive a determination about the outcome of an outbound call as dialed by ATDS 1112 from either the built-in CPA module 1112*a* or from optimized CPA service 1130.

According to an embodiment, ATDS 1112 may be an enterprise specific piece of hardware, software, or some combination of the two. Typically, dialers have a built-in CPA module 1112*a* which performs basic call progress assessment on outbound calls as dialed by dialer 1112. Built-in CPA module 1112*a* may make a determination of whether a call as dialed by dialer 1112 results in a machine response (e.g., answering machine, etc.) or a human voice response and based upon this determination the system processes the dialed call as specified by enterprise specific rules and/or logic.

According to an embodiment, the system may comprise optimized CPA service 1130 which can further comprise a plurality of modules 1131*a-n* each of which may be configured to analyze received audio stream data according to one or more of a plurality of methods in order to determine an outcome associated with the analyzed audio stream. Optimized CPA service 1130 and/or one or more of modules 1131*a-n* can operate in parallel with and an existing and/or built-in CPA module 1112*a* that may be enterprise specific. Most dialer systems used in operation today have built-in CPA 1112*a* capabilities that act as the default process for determining a call outcome. During operation optimized CPA service 1130 provides quick and optimized call progress assessment capabilities simultaneously as built-in CPA module 1112*a* processes the call using its default processes. The optimized CPA service 1130 is configured to quickly determine an outbound call designation with a certain confidence within a certain time frame. Built-in CPA module 1112*a* keeps operating in parallel with optimized CPA service 1130 and is defaulted to if optimized CPA service 1130 does not make a determination with an acceptable level of confidence within the certain time frame. Optimized CPA service 1130 may further comprise a CPA arbiter 1132 module which is configured to receive the results from each of the plurality of modules and to make a determination on the outcome of the call (e.g., answering machine/service with high confidence, live person with high confidence, etc.) based on the received results.

According to one embodiment, the optimized CPA service 1130 can provide an energy analyzer 1131*a* module configured to calculate the energy associated the audio stream of a dialed number and use the calculated energy to quickly detect answering machines (AM) (e.g., automatic voice messaging systems, etc.) or a person. Energy analyzer 1131*a* can utilize digital signal processing (DSP) software to quickly analyze audio streams associated with a specific dialed number. The audio stream may then be processed by DSP software to calculate the energy levels associated with telephone signals. The calculated energy level values can then be used to detect if the dialed number is received by an answering machine with a given confidence or if the dialed number was answered by a person with a given confidence For instance, when a live person answers a phone call, he or she usually speaks fallowed by an extended period of silence where the live person waits for a response from the caller. For example, when an answering machine or voice mail service, there is typically an initial burst of audio energy but not the extended period of silence associated with a live person. If optimized CPA service 1130 detects with high confidence an answering machine, then the call may stay connected and routed to an appropriate endpoint, such as an IVR system 1117 or an automated agent to leave an automated message. Likewise, if optimized CPA service 1130 detects with high confidence an actual person has answered the call, then the call may be connected and routed to the appropriate endpoint, such as an agent desktop 1113 and/or workstation so that a live agent can communicate with the actual person (e.g., end customer 1160). If optimized CPA service 1130 encounters inconclusive energy levels resulting in low confidence, then the system defaults to the built-in CPA module 1112*a* to determine call progress.

According to one embodiment, optimized CPA service 1130 can provide an entropy analyzer 1131*b* module configured to: analyze received audio stream data and determine the entropy of the audio stream, determine the cumulative average of entropy of audio stream, determine cumulative average power spectral amplitude of audio stream, determine cumulative average spectral entropy of audio stream, determine a difference measure of audio stream, and classify the tones and speech based on the difference measure of audio stream. The entropy levels/characteristics of tones, white noise, and speech are all distinguishably different and are used to classify the received audio stream data. In addition to the audio information other call setup information may be provided to augment the call analysis and to get a complete picture of what the call's profile will be.

According to an embodiment, optimized CPA service 1130 may be configured to receive audio stream data and process the audio stream data into a form appropriate to identify landmark features associated with the audio stream. The identified landmark features may then be used to determine and audio fingerprint associated with the audio stream. This audio fingerprint may be compared with at least one of a plurality of stored audio fingerprints wherein each stored audio fingerprint is derived from a previously processed audio stream. Fingerprint analyzer 1131*c* module may determine if the received audio stream is a recorded message (i.e., answering machine, etc.) if the associated audio stream is substantially equivalent to one of the plurality of stored fingerprints representing a recorded message.

According to an embodiment, fingerprint analyzer 1131*c* module may include a data stream receiver configured to receive audio stream data and process the audio data into the proper format for fingerprint extraction. A fingerprint extractor may process the formatted audio stream data to determine a set of landmark features (e.g., inflection points, origin alignment, etc.). The landmark features may be determined by identifying instances of clearly defined value changes at specific times in the audio stream data, and then looking for clearly defined landmark features which are particularly distinct (e.g., such as strong peaks or troughs in the process audio stream waveform, etc.). Using fingerprint analysis to determine a call outcome can be typically completed, that is that an audio stream may be received, processed, analyzed, and a determination made in about 10 ms to 350 ms with a high degree of confidence because only a direct fingerprint match as a result of the fingerprint comparison will result in a determination that an answering machine responded to the dialed call. If no fingerprint match is found, then fingerprint analyzer 1131*c* indicates that a person has answered the call and that indication may be sent to CPA arbiter 1132 for further processing.

According to an embodiment, optimized CPA service 1130 can provide a module for analyzing answering machine metadata 1131*d* in order to determine an outcome associated with received audio stream data. AMD metadata analyzer 1131*d* module can be configured to obtain and store answering machine metadata about a known greeting from an answering machine on a telephone call to a known number as dialed by dialer 1112. AMD metadata analyzer 1131*d* can receive audio stream data associated with a given outbound call and process a part of, or the entire portion of the received audio stream data to determine AMD metadata. AMD metadata analyzer 1131*d* may comprise a speech analytics module that is able to analyze the greeting (i.e., audio stream data) to develop a set of data characterizing that greeting. This dataset is referred to as the AMD metadata. According to an embodiment, AMD metadata analyzer 1131*d* can perform frequency analysis on the greeting to identify particular characteristics. In another embodiment, AMD metadata analyzer 1131*d* can generate a binary stream associated with an analyzed greeting (i.e., audio stream data) where a bit-value of 0 indicates no speech and a bit-value of 1 indicates detected speech, and then a simple bit-wise comparison can be done between newly obtained metadata against stored AMD metadata in order to make a determination about the calls outcome. There are different ways that AMD metadata analyzer 1131*d* and a speech analytics module can characterize a greeting in order to derive AMD metadata which can be used to facilitate comparison. The stored AMD metadata can then be used in subsequent calls to that known number and the greeting detected is analyzed use the stored AMD metadata to make a comparison determination if the AMD metadata obtained from the current greeting matches the stored so as to determine whether the current greeting was uttered by an AM or from a live person. If a call is made to a number with no stored AMD metadata, then AMD metadata analyzer 1131*d* can analyze the greeting and store AMD metadata. This metadata approach to call progress assessment is especially useful and quick when handling wireless telephone numbers (e.g., cellphones) because each wireless carrier typically may have slightly different, but typically uniform, default greeting on their respective AVMC, which can be quickly ascertained using available stored AMD metadata. The call outcome determination as produced by AMD metadata analyzer 1131*d* may be sent to CPA arbiter 1132 for further processing.

According to an embodiment, optimized CPA service 1130 can provide a real-time speech analyzer 1131*e* module configured to determine an outcome associated with received audio stream data. Once a call has been answered, RTS analyzer 1131*e* begins to analyze the audio stream data associated with the call to attempt to determine whether a live party or a machine has been reached. RTS analyzer 1131*e* may be configured to perform this type of analysis by listening to the cadence of the audio stream (i.e., listen for differences between in noise versus non-noise provided in the audio stream. For example, a live person answering and speaking (noise) and then an extended period of silence (non-noise) which is where a caller would respond the live person who answered the phone. Whereas an automated voice message service may result in RTS analyzer 1131*e* detecting an initial response and then detecting a lack of cadence break over the analysis period, and thus determines the call has been answered by a machine or service, and not a live party, by the end of the analysis period. The call outcome determination as produced by RTS analyzer 1131*e* may be sent to CPA arbiter 1132 for further processing.

According to an embodiment, CPA arbiter 1132 may be configured to receive one or more results from one or more of the analyzer modules 1131*a-n* and to output a call outcome determination based upon the received results. CPA arbiter 1132 can be configured to operate within a given time period wherein if results from modules 1131*a-n* are not received within the given time period, then the system 1100 defaults to using the built-in CPA module 1112*a*. Likewise, if CPA arbiter 1132 does receive the results from the processes of modules 1131*a-n* within the given time period, but is unable to ascertain an outcome with high enough confidence within the given time period, then the system 1100 defaults to using the built-in CPA module 1112*a*. In some embodiments, CPA arbiter 1132 may have configurable parameters such as outcome determination time period and outcome confidence threshold. In some embodiments, the time period parameter may be specific to an enterprise and may be dictated by enterprise specific rules and/or regulations and set by a manager or some other administrator associated with the enterprise (e.g., a contact center manager, etc.). For example, a specific contact center may choose to set the time period parameter to no more than 750 ms in order to comply with outbound call regulations, whereas a different enterprise may need more the outcome determination quicker and sets its time period parameter to 500 ms. Additionally, enterprises may be able to set an outcome confidence threshold parameter that indicates the minimum confidence value associated with each of the results from modules 1131*a-n* processing. Such a threshold parameter may be used by CPA arbiter 1132 in order to determine if an outcome result as received from the one or more of modules 1131*a-n* is reliable enough to determine if a call outcome has resulted in an answering machine response or a live person response.

According to an embodiment, dialer 1112 may be configured to perform automated dialing functions which best suit the operational needs and compliance requirements of a given organization. There are a variety of dialers that may be used in various aspects including, but not limited to, predictive dialers, progressive dialers, power dialers, and preview dialers, to name a few. A predictive dialer represents and advanced dialer option that predicts when an agent will be available to handle her next call and dial several numbers before she is actually available. Predictive dialers use algorithms based on current call center data (e.g., abandon rates, etc.) to determine how many numbers to dial. A progressive dialer automatically dials one number when an agent becomes available which causes customer's to be connected immediately with an agent. Progressive dialers are a customer friendly option, but they do not lend themselves to the same productivity levels as predictive dialers. Power dialers use a fixed calls-to-agent ratio to determine how many numbers to dial when an agent becomes available. A preview dialer gives more information and control to agents regarding the next number on the calling list. With a preview dialer an agent is first presented with useful information about the next customer which allows an agent to prepare for the call or to skip to the next one.

According to an embodiment, IVR 1117 may be an outbound IVR which can automate the distribution of large quantities of outbound, personalized communications. For example, outbound IVR can push out appointment reminders or notifications of product recalls and do it more quickly and cost-effectively than a team of agents could. Those on the receiving end can interact with the system, possibly including the options of self-serve or be connected to an agent. Additionally, calls where the outcome is determined that an answering machine or service has answered the call may be connected to IVR 1117 for leaving a voice message on the answering machine.

FIG. 12 is a block diagram illustrating an exemplary system 1200 architecture for dual-prong call progress assessment for outbound telephone dialing wherein the system components are in a distributed arrangement, according to an embodiment. The system 1200 shown in FIG. 12 has many of the same components as shown and described in detail according to FIG. 11 just in a distributed arrangement. In this embodiment, the optimized CPA service 1130 is a cloud-based service which can integrate with software and hardware that may be arranged in a different location such as for example, a call center. In this arrangement, audio stream data is sent to optimized CPA service 1130 which performs at least one of a plurality of call progress assessment methods in order to quickly and accurately determine a call outcome associated with a number dialed by ATDS 1112. The determined outcome is sent back to ATDS 1112 which then process the call as dictated by enterprise specific rules and logic. If optimized CPA service 1130 cannot make a determination in a given amount of time, then no outcome is determined and the built-in CPA module 1112*a* is defaulted to in order to determine the call outcome.

According to an embodiment, agent workstation 1205 may comprise at least an agent computer and an agent telephone. The agent computer may be a personal desktop computer or a laptop computer. The agent computer may be any suitable computing device such as a mobile device, tablet, or personal digital assistant (PDA). The agent computer may be configured with a display screen which may integrate with a user interface (UI) to provide an agent to interact with the UI via the display screen. The agent computer may be part of a local network of computers (e.g., LAN) and located in a physical contact center, or may be part of a distributed network such as a cloud-based system or wherein an agent works remotely at his or her house in which case the distributed network may be connected via a communication network such as the Internet.

Detailed Description of Exemplary Aspects

Figure 4:
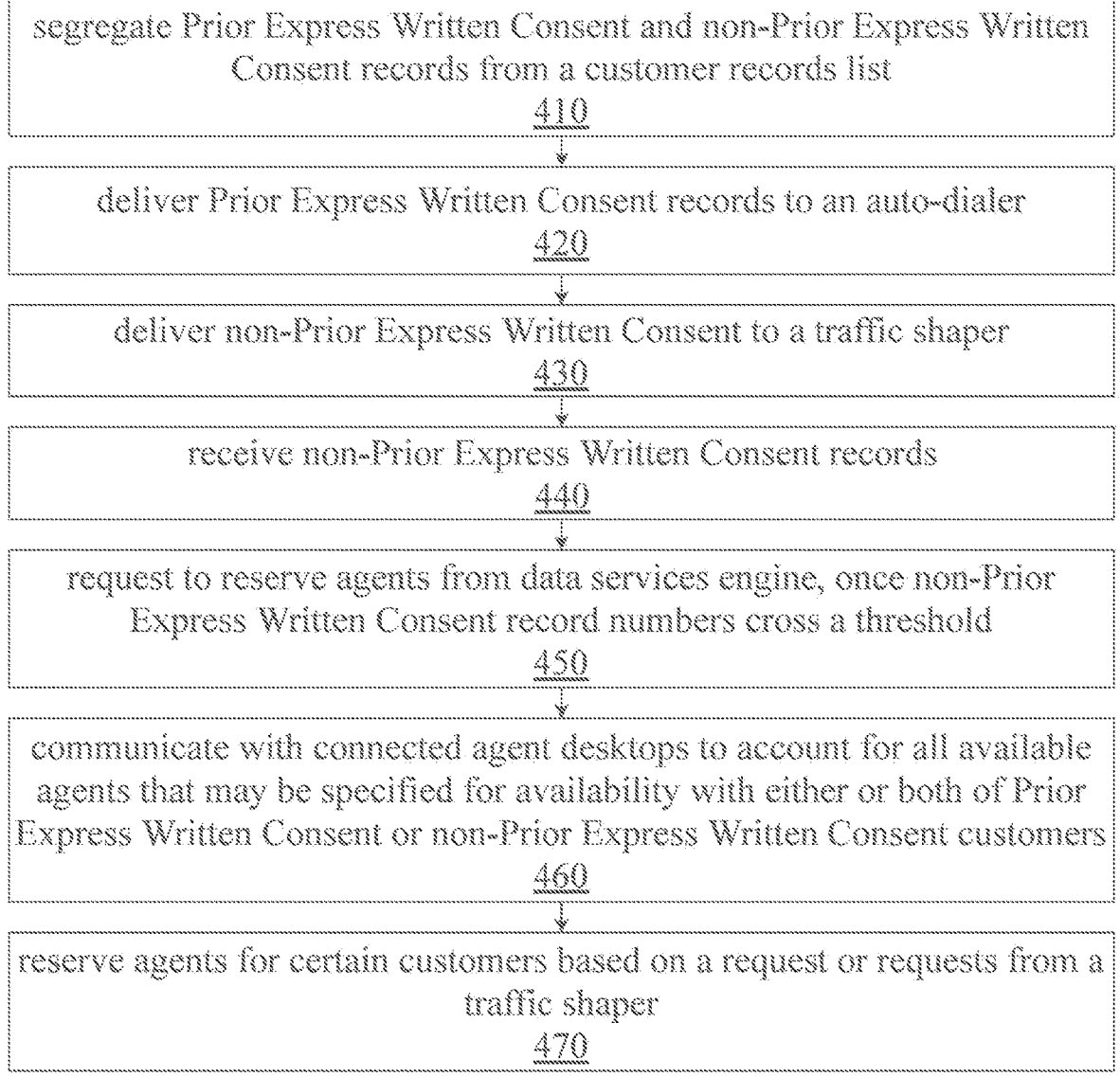
FIG. 4 is a method diagram illustrating steps taken by a system for unified autodial campaign management, according to one embodiment, illustrating steps for the processing of customer record lists, segregation of such a list based on PEWC status, and dealing with the segregated records.

FIG. 4 is a method diagram illustrating steps taken by a system for unified autodial campaign management, according to one embodiment, illustrating steps for the processing of customer record lists, segregation of such a list based on PEWC status, and dealing with the segregated records. First, after an enterprise provides a list or lists of customer records, if they are not already segregated based on PEWC Status, the system must segregate prior express written consent and non-prior express written consent records from a customer records list 410. For instance, if a database table is exported to .csv format and uploaded to a campaign management console, and each customer record has a field for "PEWC" that is either true or false, the campaign management console must separate the customer records with a "true" value in the "PEWC" field from the ones with a "false" or null value in the "PEWC" field. After this is accomplished, or if the list is already delivered in segregated format thereby bypassing the need for the campaign management console to segregate the list, the PEWC records may be delivered to an auto-dialer such as an ATDS 420 without any further processing. Non-PEWC records, however, may not be directly dialed by an ATDS under contemporary law in some legal codes and therefore they must be processed by agents rather than fully automatically dealt with. First the non-PEWC records are sent to a traffic shaper 430 which is a software application that may operate as part of the same system or a separate but connected system to the CMC, and may involve communication over a network such as a LAN or WAN. The traffic shaper receives the records 440, at which point it may make a request to reserve agents for the purpose of handling outbound non-PEWC customer communications, to a data services engine, once the number of non-prior express written consent records crosses a threshold 450. The threshold may be specified by an enterprise in the CMC for their specific campaign, or may be a configuration common to multiple enterprises and campaigns, or may be universal across all instances or uses of the CMC. The threshold may also be dynamic or programmatically defined, such as a certain percentage of the total number of records, or a number related to how many agents exist in the system to begin with. After that request is made, the data services engine may communicate with connected agent desktop software that is integrated into or otherwise connected to the cloud system, or listed in the data services engine configuration, to account for all available agents that may be specified for availability with either or both of prior express written consent or non-prior express written consent customers 460, to accurately determine the number of agents that can handle the customer records at hand. It may then reserve these agents for certain customers based on a request or requests from a traffic shaper 470, or reserve them merely for activity, meaning they cannot be scheduled for other activities until otherwise changed, but allow them to decide which customer to contact from a possible sub-list of customer records, such as if there are more customer records than agents.

FIG. 5 is a method diagram illustrating further steps taken by a system for unified autodial campaign management, according to one embodiment, illustrating steps for facilitating tethered connections between agent desktops and an auto-dialer and the customer reached by an auto-dialer, and the interaction of agent desktop software with customer records to determine the customers to contact and connect with specific agents. A data services engine may facilitate a tethered connection between an agent desktop and an auto-dialer or simple dialer 510, such that the agent desktop software may be connected to an end customer's phone (whether cellular or not), the agent desktop being possibly hosted in the same cloud platform as the data services engine and a CMC, or possibly being hosted and operated by a separate cloud or third-party contact center system. The data services engine may also allow contact center agents to establish agent availability 520, the data services engine and traffic shaper then determining which agents to reserve for PEWC or non-PEWC customer contacts, and reserve them for inbound or outbound communications, allowing the data services engine to determine which agents to send records to and tether connections to. In the process of determining which agents to tether to which customers, an agent desktop may display at least one customer number from at least one customer record delivered from a data services engine 530, such as on a computer monitor screen, to allow agents to interact with the at least one customer record 540 such as by clicking or otherwise selecting a customer record. When a customer record is selected, it may display other information about the customer, and may provide contextual menus or information to the agent, depending on the implementation. An agent may select a customer record to contact, at which point the agent desktop may dial a customer record such as a PEWC record 550, but also potentially a non-PEWC record using a secondary and non-automated simple dialer, constituting a human selection and dialing of a record, which is in accordance with laws in certain legal systems and jurisdictions. The agent desktop and data services engine may establish a tethered connection between a prior express written consent customer record and any designated recipient for the communication 560. In the case of non-PEWC records, the agent's selection is mandatory and auto-dial without human selection may not take place, before the customer record is dialed 570, and a data services engine establish a tethered connection between a designated recipient and the dialed customer number 580, wherein the designated recipient may be the selecting agent, a different agent, or a third party or alternative contact center system which may then decide which of their agents to utilize for the connection to the customer.

FIG. 6 is a directional method diagram similar to a flowchart, illustrating steps taken by a system for unified autodial campaign management, according to one embodiment. First, an enterprise representative or administrator must log into a campaign manager console 610. Logging into a CMC may be accomplished with a specialized application, a command line interface, a web browser, or some other software, over a network such as the Internet or a LAN, using a variety of possible protocols including TCP/IP, Telnet, SSH, and others. After logging into the console locally or remotely, an enterprise provides a list or lists of customer records 620, and if they are not already segregated based on PEWC Status, the system must segregate prior express written consent and non-prior express written consent records from a customer records list 630. For instance, if a database table is exported to .csv (comma separated value) format and uploaded to a campaign management console, and each customer record has a field for "PEWC" that is either true or false, the campaign management console must separate the customer records with a "true" value in the "PEWC" field from the ones with a "false" or null value in the "PEWC" field. After this is accomplished, or if the list is already delivered in segregated format thereby bypassing the need for the campaign management console to segregate the list, the PEWC records may be delivered to an auto-dialer such as an ATDS 640 without any further processing. Non-PEWC records, however, may not be directly dialed by an ATDS under contemporary law in some legal codes and therefore they must be processed by agents rather than fully automatically dealt with, and are handled by another half of the flow diagram, in FIG. 7. Agents operating agent desktop software may specify themselves as being available for PEWC records if needed 660, which may be matched with PEWC records at the auto-dialer 650 so that if and when human interaction is needed in a customer interaction, an agent may handle the communication. PEWC customers may be autodialed and interact with automated systems or an agent 670.

FIG. 7 is a second half of a directional method diagram similar to a flowchart, illustrating steps taken by a system for unified autodial campaign management, according to one embodiment. After receiving non-PEWC customer records from an enterprise, through the use of a campaign management console, non-PEWC records are delivered to a traffic shaper 710, a software engine that determines how to organize record traffic either based on absolute numbers of records, or based on agent numbers, or based on some other configuration specified by a system administrator or enterprise when setting up their campaign. A traffic shaper may be part of, or may contain as part of it, a data services engine, or a data services engine may be a separate engine from such a traffic shaper, communications between the two being interprocess or intraprocess communications, or communications across a network. A data service engine may be queried by the traffic shaper to look for available agents 720, which agents may specify on their agent desktop software 730. The traffic shaper then, having at least an initial number of available agents, continues accruing non-PEWC records, until the number of records received passes some threshold, the threshold being either based on absolute numbers of records, or based on agent numbers, or based on some other configuration specified by a system administrator or enterprise when setting up their campaign 740. Once the threshold is achieved and a minimum number of non-PEWC records is reached, the traffic shaper sends the number of available agents to a control agent or agents 750, which are specialized agents operating a specialized clicker application that may select which records to go to which regular agent desktops, either in groups or range-selection or by individually selecting records and agents 760. The customer records and numbers are sent to a simple dialer that may dial the numbers for the customers and establish a tethered connection between the customer and the regular agents 770, the numbers being selected to be dialed by either the control agents or the regular agents, thereby having non-PEWC customers not autodialed but dialed by manual human selection and a simple dialer, and interacting with a human agent 780.

FIG. 8 is a method diagram illustrating an enterprise representative operating a campaign manager console to centrally manage a unified autodial campaign, according to an aspect. An enterprise customer representative (i.e., system administrator) may log into a campaign manager console, such as with a username and password that is tied to an enterprise profile registered with the CMC, and may specify inbound agent preference and/or outbound dialer agent preference 810 for a customer contact campaign. An enterprise customer may then upload their chosen list of customer records, which must include PEWC status 820 of the customers, or may upload them in separate lists if there are some PEWC and some non-PEWC customers spread across separated lists. The campaign manager console then sorts PEWC from non-PEWC records, and sends PEWC records to an ADTS to be dialed and connected with agents, whilst it sends non-PEWC records to a contact center system specified by enterprise 830 which may be contact center systems native to the operator of the unified autodial campaign management system, or may be a third party or on-premises option favored by the enterprise customer. An alternative contact center system's agents may then handle non-PEWC communications 840, and inbound calls may come to the campaign manager cloud 850 to be redirected to the chosen inbound agent provider, if different from a default provided solution by the unified autodial campaign management system operator 860.

Such connections between agents, an ATDS, and end customers, may be tethered connections that connect an internet-enabled device and software to a phone using a PSTN or internet connection (or sometimes both, as in the case of many modern smartphones).

FIG. 9 is a message flow diagram illustrating steps taken by a system for unified autodial campaign management, according to one embodiment, illustrating steps for the processing of customer record lists, segregation of such a list based on PEWC status, and dealing with the segregated records. Present in the system is at least campaign manager console 910, a traffic shaper 915, a data services engine 920, an agent desktop 925, and an ADTS 930. Cloud contact center manager 110, which constitutes a cloud service managing several software and hardware components including a campaign manager console 910, an Automatic Telephone Dialing System ("ATDS") 930, agent desktop software 925, a traffic shaper 915 engine, and a data services engine 920. Such services may be accessed independently or through a campaign manager console 910, which may constitute a software application or applications running on a single server, a plurality of servers, or in a third-party cloud service, that may connect with users either physically at a terminal or across a network connection. Such a network connection may be a Local Area Connection ("LAN") or a Wide Area Connection ("WAN") such as the Internet, and may use any of a variety of protocols including SSH, Telnet, TCP/IP, UDP, and others. The campaign manager console 910 or "CMC" may be configured to be a centrally access point for users and administrators to access other parts of a cloud contact center manager, such as an ATDS 930 or traffic shaper 915, and may provide functionality for an administrator to create and manage a customer contact and autodialing campaign, including campaign duration, scope, customer records to contact, agent distribution and reservation settings, and agent integration with the system. Agent desktop software 925 may take the form of software operating on a virtual or physical desktop managed by the cloud system that an agent uses to set their own information such as availability and reservation status, and interact with received customer records, which may be received either directly from a CMC 910 or from data services 920 that determine which agents to send which records after a traffic shaper 915 determines how to organize the traffic from customer records to agents. A traffic shaper 915 may be a separate component to a CMC, or may be software that operates as part of the CMC 910, and determines based on the specifications of the campaign from the CMC 910 when enough customer records of PEWC or non-PEWC status are available to start reserving and interacting with agents, and sends the records to a data services engine 920, potentially with data about which agents or section of agents may be preferred for which customer records or sections of customer records. Alternatively, the data services engine 920 may make this determination about which agents are relegated to which customer records. An administrator may be a member or representative of an enterprise, an enterprise being a user of the cloud contact center manager to operate a customer contact campaign using the CMC 910 over a network such as the Internet. The enterprise must upload in some format, a list of customer records, comprising either or both of PEWC and non-PEWC customer records, either as separate lists or in one single combined list, though they must be marked or recorded as being PEWC or non-PEWC customer records if they are in a mingled list. The format of such a list may be raw text, a spreadsheet document, a .csv, a database table, direct connection to a database, or some other format for sharing data that may be common in the art. The cloud contact center manager may use, at some point during its operation, an ATDS 930 and/or agent desktop 925 to dial out to customers, using a Public Switched Telephone Network ("PSTN"), using methods described herein. First, after an enterprise provides a list or lists of customer records, if they are not already segregated based on PEWC Status, the system must segregate prior express written consent and non-prior express written consent records from a customer records list.

One way in which this may be accomplished is by segregating which phone numbers are mobile numbers, by inspecting the first several digits of the phone number, from landline numbers. Landline numbers are not subject to the same legal restrictions such as the Telephone Consumer Protection Act ("TCPA") in some jurisdictions or nations. After determining which numbers are landline and which are mobile, mobile numbers are checked against a database to determine if consent was provided for the number, while landlines may be checked in a separate database or other data storage solution to determine if the landline is ported to a mobile device, and if it has been, determine if consent has been given in the first database again.

Another method may be, if a database table is exported to .csv format and uploaded to a campaign management console, and each customer record has a field for "PEWC" that is either true or false, the campaign management console must separate the customer records with a "true" value in the "PEWC" field from the ones with a "false" or null value in the "PEWC" field. After this is accomplished, or if the list is already delivered in segregated format thereby bypassing the need for the campaign management console to segregate the list, the PEWC records may be delivered to an auto-dialer such as an ATDS without any further processing 935. Non-PEWC records, however, may not be directly dialed by an ATDS under contemporary law in some legal codes and therefore they must be processed by agents rather than fully automatically dealt with. First the non-PEWC records are sent to a traffic shaper 940 which is a software application that may operate as part of the same system or a separate but connected system to the CMC, and may involve communication over a network such as a LAN or WAN. The traffic shaper receives the records, at which point it may make a request to reserve agents for the purpose of handling outbound non-PEWC customer communications, to a data services engine 945, once the number of non-prior express written consent records crosses a threshold. The agent availability numbers depend on agent desktop statuses 925, for instance an agent may specify that they are busy or taking a break, or otherwise unable or unwilling to handle non-PEWC records at the moment of polling. The threshold may be specified by an enterprise in the CMC for their specific campaign, or may be a configuration common to multiple enterprises and campaigns, or may be universal across all instances or uses of the CMC. The threshold may also be dynamic or programmatically defined, such as a certain percentage of the total number of records, or a number related to how many agents exist in the system to begin with. After that request is made, the data services engine may communicate with connected agent desktop software that is integrated into or otherwise connected to the cloud system, or listed in the data services engine configuration, to account for all available agents that may be specified for availability with either or both of prior express written consent or non-prior express written consent customers, to accurately determine the number of agents that can handle the customer records at hand 945. It may then reserve these agents for certain customers based on a request or requests from a traffic shaper, or reserve them merely for activity, meaning they cannot be scheduled for other activities until otherwise changed, but allow them to decide which customer to contact from a possible sub-list of customer records, such as if there are more customer records than agents 950.

FIG. 10 is a message flow diagram illustrating further steps taken by a system for unified autodial campaign management, according to one embodiment, illustrating steps for facilitating tethered connections between agent desktops and an auto-dialer and the customer reached by an auto-dialer, and the interaction of agent desktop software with customer records to determine the customers to contact and connect with specific agents. Present in the system is at least campaign manager console 1010, a traffic shaper 1015, a data services engine 1020, an agent desktop 1025, and an ADTS 1030. Cloud contact center manager 110, which constitutes a cloud service managing several software and hardware components including a campaign manager console 1010, an Automatic Telephone Dialing System ("ATDS") 1030, agent desktop software 1025, a traffic shaper 1015 engine, and a data services engine 1020. Such services may be accessed independently or through a campaign manager console 1010, which may constitute a software application or applications running on a single server, a plurality of servers, or in a third-party cloud service, that may connect with users either physically at a terminal or across a network connection. Such a network connection may be a Local Area Connection ("LAN") or a Wide Area Connection ("WAN") such as the Internet, and may use any of a variety of protocols including SSH, Telnet, TCP/IP, UDP, and others. The campaign manager console 1010 or "CMC" may be configured to be a centrally access point for users and administrators to access other parts of a cloud contact center manager, such as an ATDS 1030 or traffic shaper 1015, and may provide functionality for an administrator to create and manage a customer contact and auto-dialing campaign, including campaign duration, scope, customer records to contact, agent distribution and reservation settings, and agent integration with the system. Agent desktop software 1025 may take the form of software operating on a virtual or physical desktop managed by the cloud system that an agent uses to set their own information such as availability and reservation status, and interact with received customer records, which may be received either directly from a CMC 1010 or from data services 1020 that determine which agents to send which records after a traffic shaper 1015 determines how to organize the traffic from customer records to agents. A traffic shaper 1015 may be a separate component to a CMC, or may be software that operates as part of the CMC 1010, and determines based on the specifications of the campaign from the CMC 1010 when enough customer records of PEWC or non-PEWC status are available to start reserving and interacting with agents, and sends the records to a data services engine 1020, potentially with data about which agents or section of agents may be preferred for which customer records or sections of customer records. Alternatively, the data services engine 1020 may make this determination about which agents are relegated to which customer records. An administrator may be a member or representative of an enterprise, an enterprise being a user of the cloud contact center manager to operate a customer contact campaign using the CMC 1010 over a network such as the Internet. The enterprise must upload in some format, a list of customer records, comprising either or both of PEWC and non-PEWC customer records, either as separate lists or in one single combined list, though they must be marked or recorded as being PEWC or non-PEWC customer records if they are in a mingled list. The format of such a list may be raw text, a spreadsheet document, a .csv, a database table, direct connection to a database, or some other format for sharing data that may be common in the art. The cloud contact center manager may use, at some point during its operation, an ATDS 1030 and/or agent desktop 1025 to dial out to customers, using a Public Switched Telephone Network ("PSTN"), using methods described herein. A data services engine may facilitate a tethered connection between an agent desktop and an auto-dialer 1035, such that the agent desktop software may be connected to an end customer's phone (whether cellular or not), the agent desktop being possibly hosted in the same cloud platform as the data services engine and a CMC, or possibly being hosted and operated by a separate cloud or third party contact center system. The data services engine may also allow contact center agents to establish agent availability, reserve themselves for PEWC or non-PEWC customer contacts, and reserve themselves for inbound or outbound communications, allowing the data services engine to determine which agents to send records to and tether connections to 1040. In the process of determining which agents to tether to which customers, an agent desktop may display at least one customer number from at least one customer record delivered from a data services engine, such as on a computer monitor screen, to allow agents to interact with the at least one customer record such as by clicking or otherwise selecting a customer record 1045. When a customer record is selected, it may display other information about the customer, and may provide contextual menus or information to the agent, depending on the implementation. An agent may select a customer record to contact, at which point the agent desktop may automatically dial a customer record such as a PEWC record, but also potentially a non-PEWC record, constituting a human selection and dialing of a record, which is in accordance with laws in certain legal systems and jurisdictions 1050. The agent desktop and data services engine may establish a tethered connection between a prior express written consent customer record and any designated recipient for the communication. In the case of non-PEWC records, the agent's selection is mandatory and auto-dial without human selection may not take place, before the customer record is dialed, and a data services engine establish a tethered connection between a designated recipient and the dialed customer number 1055, wherein the designated recipient may be the selecting agent, a different agent, or a third-party or alternative contact center system which may then decide which of their agents to utilize for the connection to the customer.

FIG. 13 is a flow diagram illustrating an exemplary method for providing dual-prong call progress assessment for outbound telephone dialing, according to an aspect. According to an aspect, the method begins when a dialer originates a call 1302 from a list of numbers to call. The call list may be determined by initializing a call campaign using, for example, CMC 1111. Once the call has been dialed over a PSTN 1150, a call leg may be established between the dialer and an optimized CPA service 1130 as well as the built-in CPA module 1112*a* which may be a component of dialer 1112. The call leg may allow for optimized CPA service 1130 to receive audio stream data associated with the call 1304. As part of the dual-prong method to call progress assessment the group of steps 1306 and 1316 are performed in parallel simultaneously as both optimized CPA service 1130 (e.g., steps 1306-1314) and built-in CPA module 1112*a* process the received audio stream data. At optimized CPA service 1130 the audio stream data is processed for call progress assessment at step 1306. Optimized CPA service 1130 may perform CPA using one or more analyzer modules 1131*a-n* which each produce a call outcome result at step 1308. At step 1310, each of the one or more analyzer modules 1131*a-n* sends the results on its analysis to a CPA arbiter 1132. As the various analyzer results are received by CPA arbiter 1132 it checks to see if the results are received within a given time period that may be denoted on the maximum end by a preconfigured arbiter time threshold parameter at step 1312. If there were no results received before the time threshold, then the CPA process defaults to the built-in CPA module 1112*a* at step 1316. If instead, the results from the one or more analyzer modules 1131*a-n* are received before the time threshold has been surpassed, then the process continues to step 1314 wherein CPA arbiter 1132 checks if any of the received results surpasses a predetermined (and possibly enterprise specific) confidence threshold, wherein results that surpass the confidence threshold are indicative of a strong call outcome determination. If none of the received results surpass the confidence threshold, then the CPA process defaults to the built-in CPA module 1112a at step 1316. If instead, one or more of the results has surpassed the confidence threshold, then the call outcome will be determined based on that result and the process continues to step 1318 wherein the call may be handled as dictated by enterprise specific rules and/or logic. For example, if CPA arbiter 1132 at step 1314 determines that the call outcome has resulted in a live person answering the call, then optimized CPA service 1130 can directly route the call to an agent workstation 1205 or agent desktop 1113. As another example, if CPA arbiter 1132 at step 1314 determine that the call outcome has resulted in an answering machine answering the call, then optimized CPA service 1130 can route the call to an IVR 1117 for automated messaging.

FIG. 14 is a message flow diagram illustrating further steps taken by a system for dual-prong call progress assessment for outbound telephone dialing, according to an aspect, illustrating steps for facilitating parallel call progress assessment using an optimized CPA service 1130 and a built-in CPA module 1112a. Present in this system is at least a CMC 1111, a traffic shaper 1114 engine, an ATDS 1112, a built-in CPA 1112a module, an optimized CPA service 1130, an ACD 1116, an IVR 1117, and one or more agent workstations 1205. A CMC 1111 may be used to configure and initialize a campaign by allowing an administrator to set the campaign details 1405 which may be used by both a traffic shaper 1114 to begin reserving the proper agents to execute the campaign and an ATDS 1112 to begin dialing numbers from a list wherein the list is constructed using the campaign details. The ATDS 1112 dials a number and once a connection has been made between the ATDS 1112 and the dialed number, audio stream data 1410 associated with the connected call is sent to both the built-in CPA module 1112a and optimized CPA service 1130 so that both components may process the received audio stream data in parallel. At the optimized CPA service 1130 one or more methods of analysis may be utilized on the received audio stream data in order to determine a call outcome associated with the audio stream data. If optimized CPA service 1130 determines the outcome is a live person 1415, then optimized CPA service 1130 can communicate that determination to ACD 1116 wherein the ACD can then route the call to an available agent 1420. If optimized CPA service 1130 instead determines that the outcome of the call is an answering machine pickup 1425, then optimized CPA service 1130 can communicate this determination to IVR 1117 or to another component as dictated by enterprise specific rules and logic. If optimized CPA service 1130 determines the outcome is inconclusive based on the results of the one or more methods of analysis, then this outcome is communicated 1430 to the built-in CPA module 1112a and the default CPA process may take over the rest of the audio stream data processing and call outcome determination. The built-in CPA module 1112a also receives the audio stream data and processes, in parallel to optimized CPA service 1130, it according to enterprise specific rules and logic in order to determine a call outcome associated with the audio stream data. For example, if built-in CPA 1112a determines the outcome is a live person 1435 then the call data may be sent to ACD 1116 where it can be routed to an available agent 1440, or if the outcome is an answering machine pickup 1445 then the call may be connected to IVR 1117 for automated messaging.

Hardware Architecture

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card.

Software/hardware hybrid implementations of at least some of the aspects disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be described herein in order to illustrate one or more exemplary means by which a given unit of functionality may be implemented. According to specific aspects, at least some of the features or functionalities of the various aspects disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, or other appropriate computing device), a consumer electronic device, a music player, or any other suitable electronic device, router, switch, or other suitable device, or any combination thereof. In at least some aspects, at least some of the features or functionalities of the various aspects disclosed herein may be implemented in one or more virtualized computing environments (e.g., network computing clouds, virtual machines hosted on one or more physical computing machines, or other appropriate virtual environments).

Referring now to FIG. 15, there is shown a block diagram depicting an exemplary computing device 10 suitable for implementing at least a portion of the features or functionalities disclosed herein. Computing device 10 may be, for example, any one of the computing machines listed in the previous paragraph, or indeed any other electronic device capable of executing software- or hardware-based instructions according to one or more programs stored in memory. Computing device 10 may be configured to communicate with a plurality of other computing devices, such as clients or servers, over communications networks such as a wide area network a metropolitan area network, a local area network, a wireless network, the Internet, or any other network, using known protocols for such communication, whether wireless or wired.

In one aspect, computing device 10 includes one or more central processing units (CPU) 12, one or more interfaces 15, and one or more busses 14 (such as a peripheral component interconnect (PCI) bus). When acting under the control of appropriate software or firmware, CPU 12 may be responsible for implementing specific functions associated with the functions of a specifically configured computing device or machine. For example, in at least one aspect, a computing device 10 may be configured or designed to function as a server system utilizing CPU 12, local memory 11 and/or remote memory 16, and interface(s) 15. In at least one aspect, CPU 12 may be caused to perform one or more of the different types of functions and/or operations under the control of software modules or components, which for example, may include an operating system and any appropriate applications software, drivers, and the like.

CPU 12 may include one or more processors 13 such as, for example, a processor from one of the Intel, ARM, Qualcomm, and AMD families of microprocessors. In some aspects, processors 13 may include specially designed hardware such as application-specific integrated circuits (ASICs), electrically erasable programmable read-only memories (EEPROMs), field-programmable gate arrays (FPGAs), and so forth, for controlling operations of computing device 10. In a particular aspect, a local memory 11 (such as non-volatile random access memory (RAM) and/or read-only memory (ROM), including for example one or more levels of cached memory) may also form part of CPU 12. However, there are many different ways in which memory may be coupled to system 10. Memory 11 may be used for a variety of purposes such as, for example, caching and/or storing data, programming instructions, and the like. It should be further appreciated that CPU 12 may be one of a variety of system-on-a-chip (SOC) type hardware that may include additional hardware such as memory or graphics processing chips, such as a QUALCOMM SNAPDRAGON™ or SAMSUNG EXYNOS™ CPU as are becoming increasingly common in the art, such as for use in mobile devices or integrated devices.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one aspect, interfaces 15 are provided as network interface cards (NICs). Generally, NICs control the sending and receiving of data packets over a computer network; other types of interfaces 15 may for example support other peripherals used with computing device 10. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, FIREWIRE™, THUNDERBOLT™, PCI, parallel, radio frequency (RF), BLUETOOTH™, near-field communications (e.g., using near-field magnetics), 802.11 (WiFi), frame relay, TCP/IP, ISDN, fast Ethernet interfaces, Gigabit Ethernet interfaces, Serial ATA (SATA) or external SATA (ESATA) interfaces, high-definition multimedia interface (HDMI), digital visual interface (DVI), analog or digital audio interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 15 may include physical ports appropriate for communication with appropriate media. In some cases, they may also include an independent processor (such as a dedicated audio or video processor, as is common in the art for high-fidelity A/V hardware interfaces) and, in some instances, volatile and/or non-volatile memory (e.g., RAM).

Although the system shown in FIG. 15 illustrates one specific architecture for a computing device 10 for implementing one or more of the aspects described herein, it is by no means the only device architecture on which at least a portion of the features and techniques described herein may be implemented. For example, architectures having one or any number of processors 13 may be used, and such processors 13 may be present in a single device or distributed among any number of devices. In one aspect, a single processor 13 handles communications as well as routing computations, while in other aspects a separate dedicated communications processor may be provided. In various aspects, different types of features or functionalities may be implemented in a system according to the aspect that includes a client device (such as a tablet device or smartphone running client software) and server systems (such as a server system described in more detail below).

Regardless of network device configuration, the system of an aspect may employ one or more memories or memory modules (such as, for example, remote memory block 16 and local memory 11) configured to store data, program instructions for the general-purpose network operations, or other information relating to the functionality of the aspects described herein (or any combinations of the above). Program instructions may control execution of or comprise an operating system and/or one or more applications, for example. Memory 16 or memories 11, 16 may also be configured to store data structures, configuration data, encryption data, historical system operations information, or any other specific or generic non-program information described herein.

Because such information and program instructions may be employed to implement one or more systems or methods described herein, at least some network device aspects may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory (as is common in mobile devices and integrated systems), solid state drives (SSD) and "hybrid SSD" storage drives that may combine physical components of solid state and hard disk drives in a single hardware device (as are becoming increasingly common in the art with regard to personal computers), memristor memory, random access memory (RAM), and the like. It should be appreciated that such storage means may be integral and non-removable (such as RAM hardware modules that may be soldered onto a motherboard or otherwise integrated into an electronic device), or they may be removable such as swappable flash memory modules (such as "thumb drives" or other removable media designed for rapidly exchanging physical storage devices), "hot-swappable" hard disk drives or solid state drives, removable optical storage discs, or other such removable media, and that such integral and removable storage media may be utilized interchangeably. Examples of program instructions include both object code, such as may be produced by a compiler, machine code, such as may be produced by an assembler or a linker, byte code, such as may be generated by for example a JAVA™ compiler and may be executed using a Java virtual machine or equivalent, or files containing higher level code that may be executed by the computer using an interpreter (for example, scripts written in Python, Perl, Ruby, Groovy, or any other scripting language).

In some aspects, systems may be implemented on a standalone computing system. Referring now to FIG. 16, there is shown a block diagram depicting a typical exemplary architecture of one or more aspects or components thereof on a standalone computing system. Computing device 20 includes processors 21 that may run software that carry out one or more functions or applications of aspects, such as for example a client application 24. Processors 21 may carry out computing instructions under control of an operating system 22 such as, for example, a version of MICROSOFT WINDOWS™ operating system, APPLE macOS™ or iOS™ operating systems, some variety of the Linux operating system, ANDROID™ operating system, or the like. In many cases, one or more shared services 23 may be operable in system 20, and may be useful for providing common services to client applications 24. Services 23 may for example be WINDOWS™ services, user-space common services in a Linux environment, or any other type of common service architecture used with operating system 21. Input devices 28 may be of any type suitable for receiving user input, including for example a keyboard, touchscreen, microphone (for example, for voice input), mouse, touchpad, trackball, or any combination thereof. Output devices 27 may be of any type suitable for providing output to one or more users, whether remote or local to system 20, and may include for example one or more screens for visual output, speakers, printers, or any combination thereof. Memory 25 may be random-access memory having any structure and architecture known in the art, for use by processors 21, for example to run software. Storage devices 26 may be any magnetic, optical, mechanical, memristor, or electrical storage device for storage of data in digital form (such as those described above, referring to FIG. 15). Examples of storage devices 26 include flash memory, magnetic hard drive, CD-ROM, and/or the like.

In some aspects, systems may be implemented on a distributed computing network, such as one having any number of clients and/or servers. Referring now to FIG. 17, there is shown a block diagram depicting an exemplary architecture 30 for implementing at least a portion of a system according to one aspect on a distributed computing network. According to the aspect, any number of clients 33 may be provided. Each client 33 may run software for implementing client-side portions of a system; clients may comprise a system 20 such as that illustrated in FIG. 16. In addition, any number of servers 32 may be provided for handling requests received from one or more clients 33. Clients 33 and servers 32 may communicate with one another via one or more electronic networks 31, which may be in various aspects any of the Internet, a wide area network, a mobile telephony network (such as CDMA or GSM cellular networks), a wireless network (such as WiFi, WiMAX, LTE, and so forth), or a local area network (or indeed any network topology known in the art; the aspect does not prefer any one network topology over any other). Networks 31 may be implemented using any known network protocols, including for example wired and/or wireless protocols.

In addition, in some aspects, servers 32 may call external services 37 when needed to obtain additional information, or to refer to additional data concerning a particular call. Communications with external services 37 may take place, for example, via one or more networks 31. In various aspects, external services 37 may comprise web-enabled services or functionality related to or installed on the hardware device itself. For example, in one aspect where client applications 24 are implemented on a smartphone or other electronic device, client applications 24 may obtain information stored in a server system 32 in the cloud or on an external service 37 deployed on one or more of a particular enterprise's or user's premises. In addition to local storage on servers 32, remote storage 38 may be accessible through the network(s) 31.

In some aspects, clients 33 or servers 32 (or both) may make use of one or more specialized services or appliances that may be deployed locally or remotely across one or more networks 31. For example, one or more databases 34 in either local or remote storage 38 may be used or referred to by one or more aspects. It should be understood by one having ordinary skill in the art that databases in storage 34 may be arranged in a wide variety of architectures and using a wide variety of data access and manipulation means. For example, in various aspects one or more databases in storage 34 may comprise a relational database system using a structured query language (SQL), while others may comprise an alternative data storage technology such as those referred to in the art as "NoSQL" (for example, HADOOP CASSANDRA™, GOOGLE BIGTABLE™, and so forth). In some aspects, variant database architectures such as column-oriented databases, in-memory databases, clustered databases, distributed databases, or even flat file data repositories may be used according to the aspect. It will be appreciated by one having ordinary skill in the art that any combination of known or future database technologies may be used as appropriate, unless a specific database technology or a specific arrangement of components is specified for a particular aspect described herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, some aspects may make use of one or more security systems 36 and configuration systems 35. Security and configuration management are common information technology (IT) and web functions, and some amount of each are generally associated with any IT or web systems. It should be understood by one having ordinary skill in the art that any configuration or security subsystems known in the art now or in the future may be used in conjunction with aspects without limitation, unless a specific security 36 or configuration system 35 or approach is specifically required by the description of any specific aspect.

FIG. 18 shows an exemplary overview of a computer system 40 as may be used in any of the various locations throughout the system. It is exemplary of any computer that may execute code to process data. Various modifications and changes may be made to computer system 40 without departing from the broader scope of the system and method disclosed herein. Central processor unit (CPU) 41 is connected to bus 42, to which bus is also connected memory 43, nonvolatile memory 44, display 47, input/output (I/O) unit 48, and network interface card (NIC) 53. I/O unit 48 may, typically, be connected to peripherals such as a keyboard 49, pointing device 50, hard disk 52, real-time clock 51, a camera 57, and other peripheral devices. NIC 53 connects to network 54, which may be the Internet or a local network, which local network may or may not have connections to the Internet. The system may be connected to other computing devices through the network via a router 55, wireless local area network 56, or any other network connection. Also shown as part of system 40 is power supply unit 45 connected, in this example, to a main alternating current (AC) supply 46. Not shown are batteries that could be present, and many other devices and modifications that are well known but are not applicable to the specific novel functions of the current system and method disclosed herein. It should be appreciated that some or all components illustrated may be combined, such as in various integrated applications, for example Qualcomm or Samsung system-on-a-chip (SOC) devices, or whenever it may be appropriate to combine multiple capabilities or functions into a single hardware device (for instance, in mobile devices such as smartphones, video game consoles, in-vehicle computer systems such as navigation or multimedia systems in automobiles, or other integrated hardware devices).

In various aspects, functionality for implementing systems or methods of various aspects may be distributed among any number of client and/or server components. For example, various software modules may be implemented for performing various functions in connection with the system of any particular aspect, and such modules may be variously implemented to run on server and/or client components.

The skilled person will be aware of a range of possible modifications of the various aspects described above. Accordingly, the present invention is defined by the claims and their equivalents.

What is claimed is:

1. A system for dual-prong call progress assessment and routing, comprising:
   an auto-dialer comprising a first plurality of programming instructions stored in a memory of, and operating on a processor of, a computer system, wherein the first plurality of programming instructions, when operating on the at least one processor, causes the computer system to:
   establish an outbound call to a dialed number;
   send data associated with the outbound call to a call progress assessment service;
   receive a status indicator from the call progress assessment service;
   based on the status indicator:
      process the data associated with the outbound call to determine a call progress assessment, using a plurality of rules for classifying the data as either having a live person connected or as having an answering machine connected;
      determine whether a live person is expected or whether an answering machine is expected;
      if a live person is expected, route the outbound call to an available contact center agent; and
      if an answering machine is expected, route the outbound call to an interactive voice response system.

2. The system of claim 1, further comprising the call progress assessment service comprising at least a second plurality of programming instructions stored in the at least one memory of, and operating on at least one processor of, the computer system, wherein the second plurality of programming instructions, when operating on the at least one processor, cause the computer system to:
   receive the data associated with the outbound call;
   process the received data using a call progress analysis method comprising at least one of energy analysis, entropy analysis, fingerprint analysis, answering machine metadata (AMD) analysis, and real-time speech analysis;
   determine a status indicator comprising a determination as to whether a live person is detected or whether an answering machine is detected; and
   send the status indicator to the auto-dialer.

3. The system of claim 2, further wherein the call progress assessment service is configured to:
   determine if the status indicator is determined before a threshold time period is surpassed;
   determine if the status indicator has a confidence rating greater than a confidence threshold;
   wherein if the threshold time period is not surpassed and the confidence rating is greater than the confidence threshold, route the outbound call either to an available agent where the status indicator determines that a live person is detected or to an interactive voice response system where the status indicator determines that an answering machine has been detected.

4. The system of claim 2, wherein the call progress assessment service uses a plurality of call progress analysis methods to determine the call progress assessment, wherein the plurality of call progress analysis methods comprises at least one of energy analysis, entropy analysis, fingerprint analysis, AMD metadata analysis, and real-time speech analysis.

5. The system of claim 1, further comprising a customer records list comprising a plurality of customer records with prior express written consent, wherein each record comprises a corresponding customer phone number, a plurality of non-prior express written consent records, and wherein a campaign manager further segregates prior express written consent records and non-prior express written consent records from the customer records list.

6. The system of claim 5, further comprising an agent desktop comprising a third plurality of programming instructions stored in the memory of, and operating on the processor of, the computer system, wherein the third plurality of programming instructions, when operating on the processor, causes the computer system to:
   display a plurality of non-prior express written consent customer records; and
   forward at least one non-prior express written consent customer record to the auto-dialer.

7. The system of claim 6, further comprising a data services engine comprising a fourth plurality of programming instructions stored in the memory of, and operating on the processor of, the computer system, wherein the fourth plurality of programming instructions, when operating on the processor, causes the computer system to:
   determine availability of the agent desktop for a plurality of non-prior express written consent customers; and
   reserve the agent desktop for at least one of the plurality of non-prior express written consent customers.

8. The system of claim 7, further comprising a traffic shaper comprising a fifth plurality of programming instructions stored in the memory of, and operating on the processor of, the computer system, wherein the fifth plurality of programming instructions, when operating on the processor, causes the computer system to:
   receive a plurality of non-prior express written consent records; and
   request to reserve agents from the data services engine if the number of received non-prior express written consent records crosses a predetermined threshold.

9. The system of claim 5, further comprising a simple dialer comprising a sixth plurality of programming instructions stored in the memory of, and operating on the processor of, the computer system, wherein the sixth plurality of programming instructions, when operating on the processor, causes the computer system to:
   receive a forwarded non-prior express written consent customer record from an agent desktop;
   dial a customer number associated with the forwarded non-prior express written consent customer record; and establish an outbound call to the customer number associate with the forwarded non-prior express written consent customer record.

10. The system of claim 9, wherein the campaign management console, auto-dialer, simple dialer, call progress assessment service, and agent desktop are each independently operated as separate components communicating over a network.

11. The system of claim 10, wherein the network is a local area network (LAN).

12. The system of claim 10, wherein the network is a wide area network (WAN).

13. The system of claim 10, wherein the network is a mesh network.

14. The system of claim 10, wherein the network is the Internet.

15. The system of claim 14, wherein at least one separate component is operated as a cloud-based service.

16. A method for dual-prong call progress assessment and routing, comprising the steps of:
    establishing, using an auto-dialer, an outbound call to a dialed number;
    sending data associated with the outbound call to a call progress assessment service;
    receiving a status indicator from the call progress assessment service;
    based on the status indicator:
        processing the data associated with the outbound call to determine a call progress assessment, using a plurality of rules for classifying the data as either having a live person connected or as having an answering machine connected;
        determining whether a live person is expected or whether an answering machine is expected;
        if a live person is expected, routing the outbound call to an available contact center agent; and
        if an answering machine is expected, routing the outbound call to an interactive voice response system.

17. The method of claim 16, further comprising the steps of:
    receiving, at a call progress assessment service, the data associated with the outbound call;
    processing the received data using a call progress analysis method comprising at least one of energy analysis, entropy analysis, fingerprint analysis, answering machine metadata (AMD) analysis, and real-time speech analysis;
    determining a status indicator comprising a determination as to whether a live person is detected or whether an answering machine is detected; and
    sending the status indicator to the auto-dialer.

18. The method of claim 17, further comprising the steps of:
    determining if the status indicator is determined before a threshold time period is surpassed;
    determining if the status indicator has a confidence rating greater than a confidence threshold;
    wherein if the threshold time period is not surpassed and the confidence rating is greater than the confidence threshold, routing the outbound call either to an available agent where the status indicator determines that a live person is detected or to an interactive voice response system where the status indicator determines that an answering machine has been detected.

19. The method of claim 17, wherein the call progress assessment service uses a plurality of call progress analysis methods to determine the call progress assessment, wherein the plurality of call progress analysis methods comprises at least one of energy analysis, entropy analysis, fingerprint analysis, AMD metadata analysis, and real-time speech analysis.

20. The method of claim 16, further comprising a customer records list comprising a plurality of customer records with prior express written consent, wherein each record comprises a corresponding customer phone number, a plurality of non-prior express written consent records, and wherein a campaign manager further segregates prior express written consent records and non-prior express written consent records from the customer records list.

21. The method of claim 20, further comprising the steps of:
    displaying, at an agent desktop, a plurality of non-prior express written consent customer records; and
    forwarding at least one non-prior express written consent customer record to the auto-dialer.

22. The method of claim 21, further comprising the steps of:
    determining, at a data services engine, availability of the agent desktop for a plurality of non-prior express written consent customers; and
    reserving the agent desktop for at least one of the plurality of non-prior express written consent customers.

23. The method of claim 22, further comprising the steps of:
    receiving, at a traffic shaper, plurality of non-prior express written consent records; and
    requesting to reserve agents from the data services engine if the number of received non-prior express written consent records crosses a predetermined threshold.

24. The system of claim 20, further comprising the steps of:
    receiving, at a simple dialer, a forwarded non-prior express written consent customer record from an agent desktop;
    dialing a customer number associated with the forwarded non-prior express written consent customer record; and
    establishing an outbound call to the customer number associate with the forwarded non-prior express written consent customer record.

25. The method of claim 24, wherein the campaign management console, auto-dialer, simple dialer, call progress assessment service, and agent desktop are each independently operated as separate components communicating over a network.

26. The method of claim 25, wherein the network is a local area network (LAN).

27. The method of claim 25, wherein the network is a wide area network (WAN).

28. The method of claim 25, wherein the network is a mesh network.

29. The method of claim 25, wherein the network is the Internet.

30. The method of claim 29, wherein at least one separate component is operated as a cloud-based service.

* * * * *